(12) United States Patent
Tan et al.

(10) Patent No.: US 10,977,197 B2
(45) Date of Patent: Apr. 13, 2021

(54) PROVIDING MULTIPLE LOW POWER LINK STATE WAKE-UP OPTIONS

(71) Applicant: Intel Corporation, Santa Clara, CA (US)

(72) Inventors: Kuan Hua Tan, Coquitlam (CA); Ang Li, Coquitlam (CA); Eng Hun Ooi, Georgetown (MY)

(73) Assignee: Intel Corporation, Santa Clara, CA (US)

( * ) Notice: Subject to any disclaimer, the term of this patent is extended or adjusted under 35 U.S.C. 154(b) by 89 days.

(21) Appl. No.: 16/367,846

(22) Filed: Mar. 28, 2019

(65) Prior Publication Data

US 2019/0220422 A1 Jul. 18, 2019

(51) Int. Cl.

| G06F 1/26 | (2006.01) |
|---|---|
| G06F 1/32 | (2019.01) |
| G06F 13/16 | (2006.01) |
| G06F 1/3234 | (2019.01) |
| G06F 9/30 | (2018.01) |
| G06F 9/50 | (2006.01) |
| G06F 1/3206 | (2019.01) |

(52) U.S. Cl.
CPC .......... *G06F 13/161* (2013.01); *G06F 1/3206* (2013.01); *G06F 1/3253* (2013.01); *G06F 9/30101* (2013.01); *G06F 9/5005* (2013.01); G06F 2213/0026 (2013.01)

(58) Field of Classification Search
CPC .... G06F 1/3206; G06F 1/3253; G06F 13/161; G06F 9/5005; G06F 9/30101; G06F 2213/0026
See application file for complete search history.

(56) References Cited

U.S. PATENT DOCUMENTS

| 7,225,350 B2* | 5/2007 | Gutman | G06F 1/3209 370/276 |
|---|---|---|---|
| 2008/0197802 A1* | 8/2008 | Onishi | H02J 7/00047 320/106 |
| 2009/0327774 A1* | 12/2009 | Jeyaseelan | G06F 1/3203 713/320 |
| 2012/0185632 A1* | 7/2012 | Lais | G06F 13/404 710/308 |
| 2014/0082242 A1* | 3/2014 | Murphy | G06F 1/3253 710/263 |
| 2017/0366016 A1* | 12/2017 | Zhao | H02J 7/007 |

* cited by examiner

*Primary Examiner* — Nitin C Patel
(74) *Attorney, Agent, or Firm* — Alliance IP, LLC

(57) ABSTRACT

Systems and devices can include a power management controller to determine a low power mode exit timing from a plurality of low power mode exit timing options, and cause the setting of a low power mode control register based on the determined low power mode exit timing. A message generator can generate a power mode request message. The power mode request message indicating the determined low power mode exiting timing. The power mode request message can be transmitted to a host across a multilane link.

21 Claims, 18 Drawing Sheets

PROVIDING MULTIPLE LOW POWER LINK STATE WAKE-UP OPTIONS

BACKGROUND

Interconnects can be used to provide communication between different devices within a system, some type of interconnect mechanism is used. One typical communication protocol for communications interconnects between devices in a computer system is a Peripheral Component Interconnect Express (PCI Express™ (PCIe™)) communication protocol. This communication protocol is one example of a load/store input/output (I/O) interconnect system. The communication between the devices is typically performed serially according to this protocol at very high speeds.

Devices can be connected across various numbers of data links, each data link including a plurality of data lanes. Upstream devices and downstream devices undergo link training upon initialization to optimize data transmissions across the various links and lanes.

DETAILED DESCRIPTION

Figure 1:
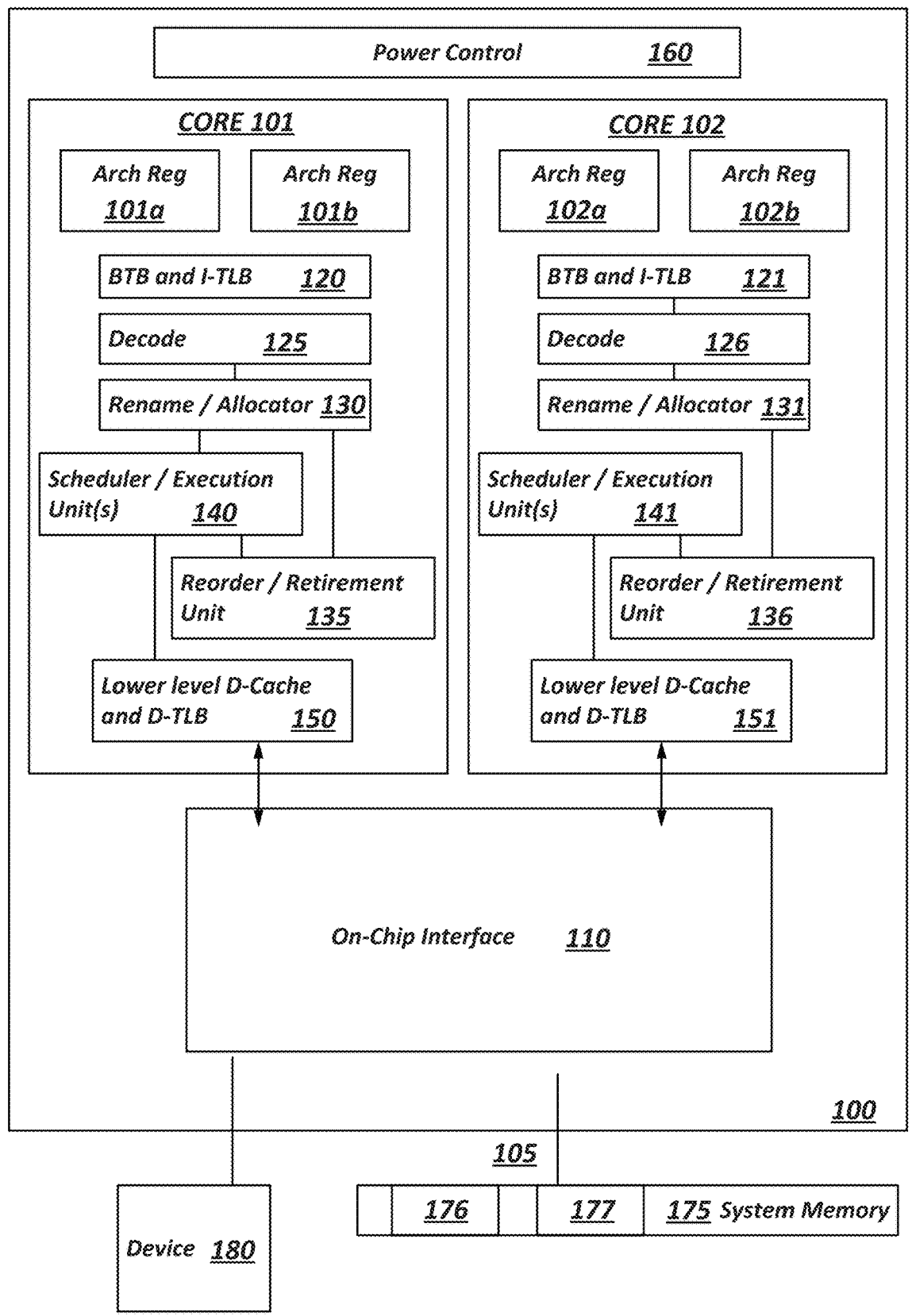
FIG. 1 illustrates an embodiment of a block diagram for a computing system including a multicore processor.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it is a singular purpose of most fabrics to provide highest possible performance with maximum power saving. Below, a number of interconnects are discussed, which would potentially benefit from aspects of the disclosure described herein.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such as a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 11 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

In some power-saving-capable computing systems, such as those using one or more PCIe-based components, if a PCIe component supports an L1.2 substate (either PCI-Power Management (PM) L1.2 or Active State Power Management (ASPM) L1.2), PCIe Specification defines the timing parameter known as Tpower_on. Tpower_on is the minimum amount of time that each component must wait in L1.2.Exit after sampling CLKREQ# asserted before actively driving the interface to ensure no device is ever actively driving into an unpowered component. Tpower_on is calculated by multiplying the value of T_POWER_ON_SCALE by the value of T_POWER_ON_VALUE in the L1 PM Substates Control 2 Register.

PCIe includes one L1.2-exit timing parameter for the system to configure, which prevents the system from applying more fine-tuned power and performance trade-off policies when a device is in L1.2 substate. This disclosure describes mechanisms to provide additional wake-up time options, as well as other power-saving strategies and power-saving state granularity, for a PCIe device that is in L1.2 state.

This disclosure describes L1.2 exit time information communication mechanisms between the L1.2-capable PCIe device and the host (e.g., a system-on-chip (SoC) host). The L1.2 power substate is a low power substate as defined as follows:

TABLE 1

Low Power States.

| Power Substates | | | | Status (On/Off) | | Targets | |
|---|---|---|---|---|---|---|---|
| Link | PHY/PIPE | PLL | Rx/Tx | Common Mode Keepers | 1-Lane Power | Exit Latency | |
| L1 | P1 | On/Off | Off/Idle | On | 20 s of µW 10 s of µW | <5 µs (retrain) <20 µs (PLL Off) | |
| L1.1 | P1.1 | Off | Off | On | <500 µW | <20 µs | |
| L1.2 | P1.2 | Off | Off | Off | <10 µW | <70 µs | |

A difference between L1.1 and L1.2 is the common mode voltage status, which is maintained in the L1.1 and is turned off in L1.2 sub-state. Therefore, because of the common mode restoration time, exit latency of L1.2 is much longer than L1.1.

Some embodiments can include the conveyance of vendor-specific power-mode selection information during handshake between the L1.2-capable device and the host through the interconnect link.

Some embodiments can include mapping the different L1.2-exiting time options to the power-mode options. Prior to L1 and L1.2 entry, the Device EndPoint sends VDM or LTR to the Host Root-Complex, which in turn will automatically pick up the corresponding settings of the respective L1.2-exiting timing feature.

The advantages of the systems, methods, and devices described herein will be readily apparent to those of skilled in the art. Among the advantages include facilitating the L1.2-capable device to provide multiple finer granularity power states to a power-saving-capable system so that a system power architecture can be more optimized.

In addition, a generic mechanism is described to broadcast or exchange dynamic system update needs from both Host RC and Device EP point of view, depending on system architecture needs, in run-time.

Also, systems, methods, and devices are described that can fortify 2LM-related and other potential computing systems by using vendor specific critical power-mode information and preventing it from being exposed to potential competitors or malicious actors.

Figure 2:
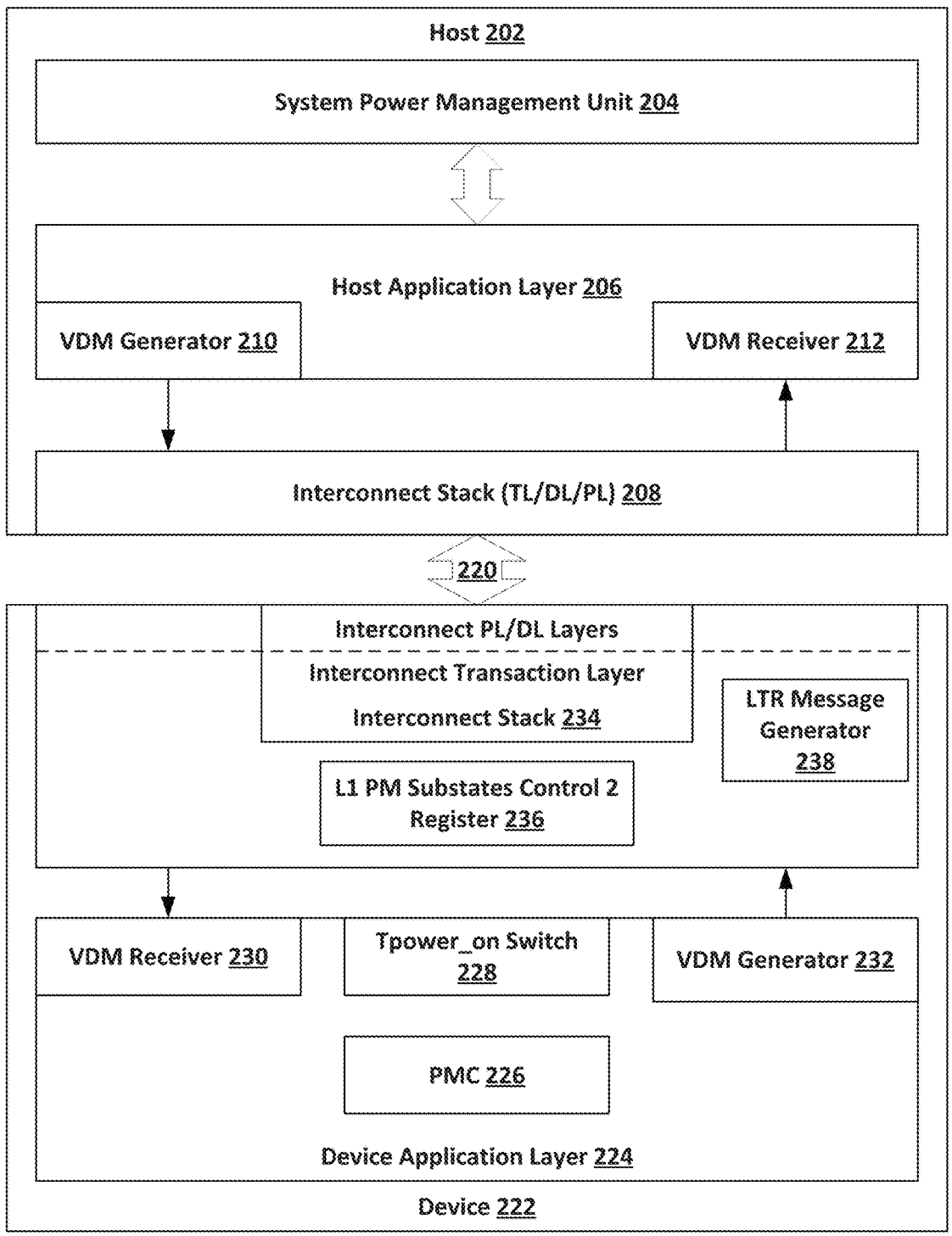
FIG. 2 is a schematic diagram of a system that includes a host connected to a downstream device in accordance with embodiments of the present disclosure.

FIG. 2 is a schematic diagram of a system 200 that includes a host connected to a downstream device in accordance with embodiments of the present disclosure. System 200 can include a host 202. Host 202 can include a core processor and can include a root complex system for interconnecting various connected devices with the host 202. The host 202 can be a system-on-chip design or can be an independent unit, each capable of being coupled to other devices across a multilane link 220, such as an interconnect link compliant with a PCIe-based protocol.

The host 202 can include a system power management unit 204. System power management unit 204 can be responsible for various power management functions, including controlling entering and exiting various link states. Generally, system power management unit 204 can be a microcontroller that governs power functions of computing platforms. The system power management unit 204 can include hardware, firmware and/or software, memory (or access to memory), input/output functions, timers to measure intervals of time, and logic circuitry (e.g., analog to digital converters) to measure the voltages of the power sources of the computer and/or connected devices. The system power management unit 204 is one of the few items to remain active even when the computer is completely shut down, powered by the backup battery. The system power management unit 204 can be responsible for coordinating many functions, including controlling link states, monitoring power connections and battery charges, charging batteries when necessary, controlling power to other integrated circuits, shutting down unnecessary system components when they are left idle, controlling sleep and power functions (on and off), managing the interface for built in keypad and trackpads on portable computers, and regulating the real-time clock (RTC).

The host 202 can include a host application layer 206. The host application layer 206 can include a vendor-defined message (VDM) generator 210 implemented in hardware, software, or a combination of hardware and software. The VDM generator 210 can be implemented in the host 202 application layer 206 to compose VDMs and present them to standard PCIe Transaction layer in the interconnect stack 208 for transmission across link 220.

The host 202 can also include, in the host application layer 206, a VDM receiver 212. VDM receiver 212 can receive VDM messages across an interconnect link. The VDM receiver 212 can parse, interpret, or decipher an incoming VDM message. In embodiments, the VDM receiver 212 can determine responses to VDM messages by parsing the VDM message and retrieving information in response to the VDM message (e.g., by accessing appropriate memory locations, tables, databases, functional or logical components, etc.).

The system 200 can include one or more connected devices, such as device 222. Device 222 can include a device application layer 224. The device application layer 224 can include a power management controller (PMC) 226. PMC 226 can be implemented using hardware components, as well as software or firmware, including finite state machines that can maintain power and link states. The PMC 226 can provide power control functions for the device 222.

The device application layer 224 can also include a VDM generator 232 and a VDM receiver 230, which are similar to those described above. The device application layer 224 also includes a component referred to herein as a Tpower_on Switch. The Tpower_on Switch can reside in the device application layer 224 (or in the host application layer 206). The Tpower_on Switch can resolve final values to override T_POWER_ON_SCALE and T_POWER_ON_VALUE in the L1 PM Substates Control 2 Register 236. The L1 PM substates Control 2 Register can be part of the L1 PM Substates Extended Capability Structure at either the host 202 root complex or the device 222 interconnect stack 234 (including the transaction layer or physical layer or data layer).

An example PCIe definition of the L1 PM Substates Control 2 Register is provided in Table 2.

TABLE 2

| | PCIe L1 PM Substates Control 2 Register Definition | |
|---|---|---|
| Bit Location | Register Description | Attributes |
| 1:0 | T_POWER_ON Scale - Specifies the scale used for T_POWER_ON value<br>Range of Values<br>00b = 2 μs<br>01b = 10 μs<br>10b = 100 μs<br>11b = Reserved<br>Required for all Ports that support L1.2, otherwise this field is of type RsvdP.<br>This field must only be modified when | RW/RsvdP |

TABLE 2-continued

| | PCIe L1 PM Substates Control 2 Register Definition | |
|---|---|---|
| Bit Location | Register Description | Attributes |
| | the ASPM L1.2 Enable and PCI-PM L1.2 Enable bits are both Clear. The Port behavior is undefined if this field is modified when either the ASPM L1.2 Enable and/or PCI-PM L1.2 Enable bit(s) are Set. | |
| 2 | Reserved | RsvdP |
| 7:3 | T_POWER_ON Value - Along with the T_POWER_ON Scale, sets the minimum amount of time (in ms) that the Port must wait in L1.2. Exit after sampling CLKREQ# asserted before actively driving the interface.<br>T_POWER_ON is calculated by multiplying the value in this field by the value in the T_POWER_ON Scale field.<br>This field must only be modified when the ASPM L1.2 Enable and PCI-PM L1.2 Enable bits are both Clear. The Port behavior is undefined if this field is modified when either the ASPM L1.2 Enable and/or PCI-PM L1.2 Enable bit(s) are Set.<br>Default value is 0010b Required for all Ports that support L1.2, otherwise this field is of type RsvdP. | RW/RsvdP |
| 31:8 | Reserved | RsvdP |

Figure 3A:
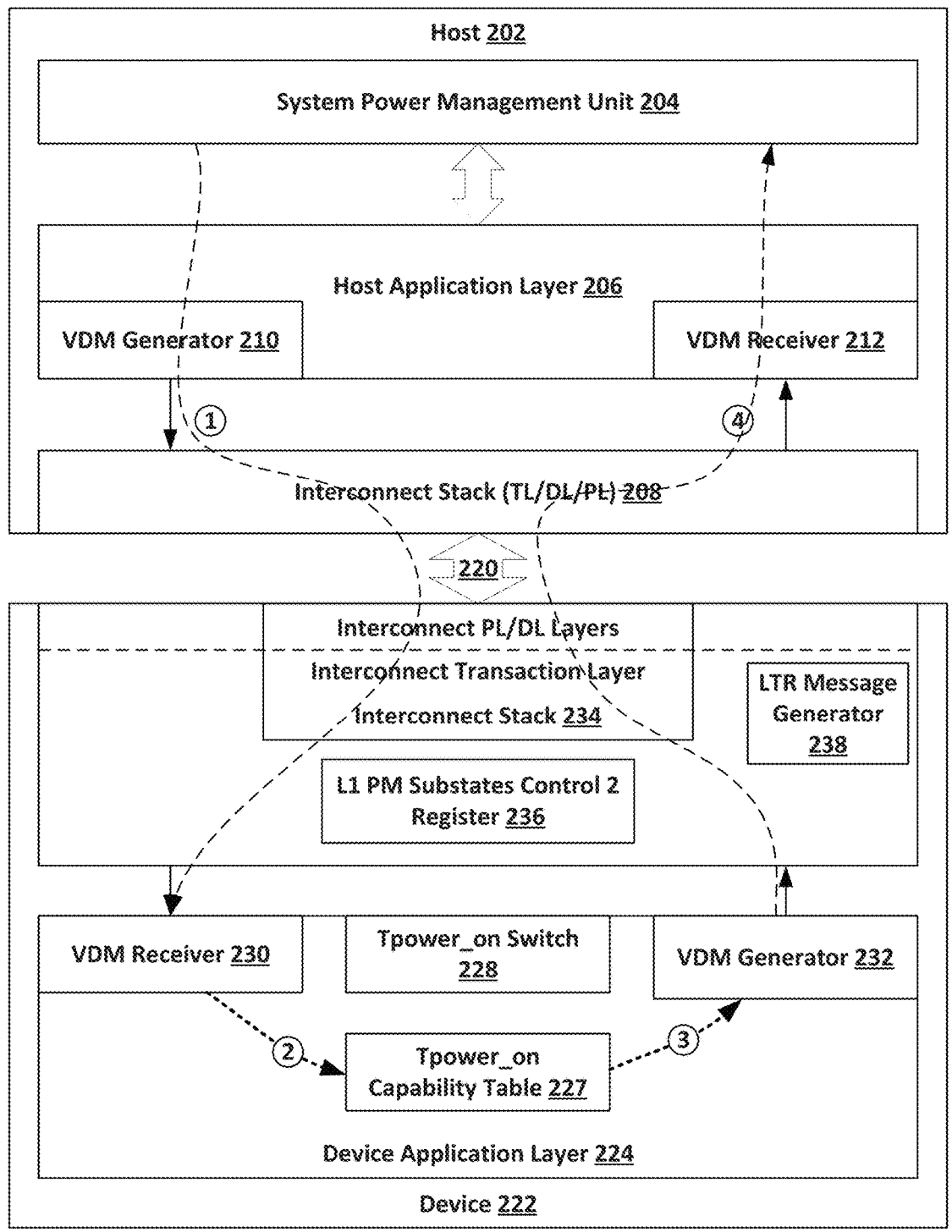
FIG. 3A is a schematic diagram of the system of FIG. 2 illustrating an example of system initialization for providing multiple wake-up time options in accordance with embodiments of the present disclosure.
Figure 3B:
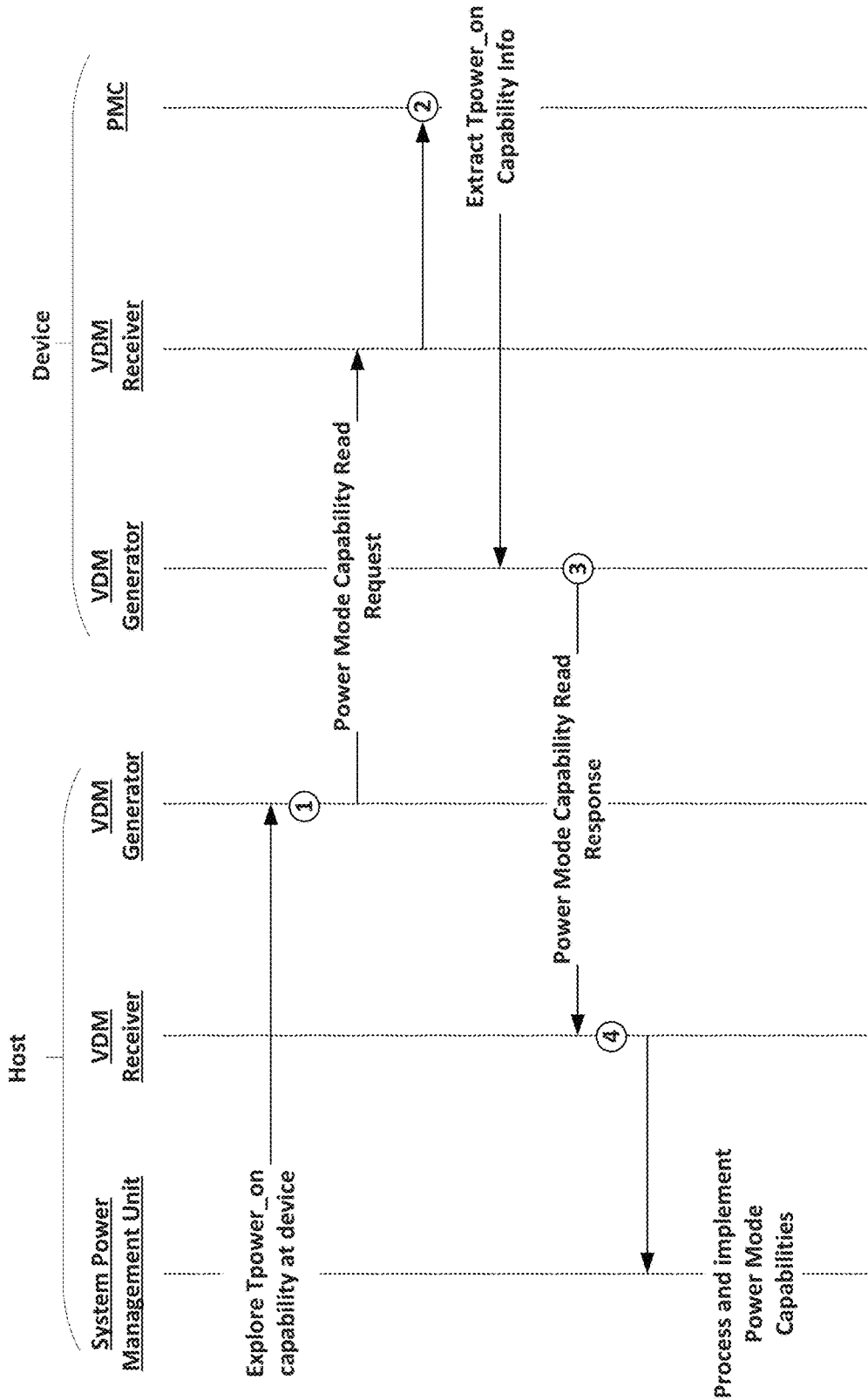
FIG. 3B is a swim lane diagram illustrating an example initialization procedure in accordance with embodiments of the present disclosure.
Figure 4A:
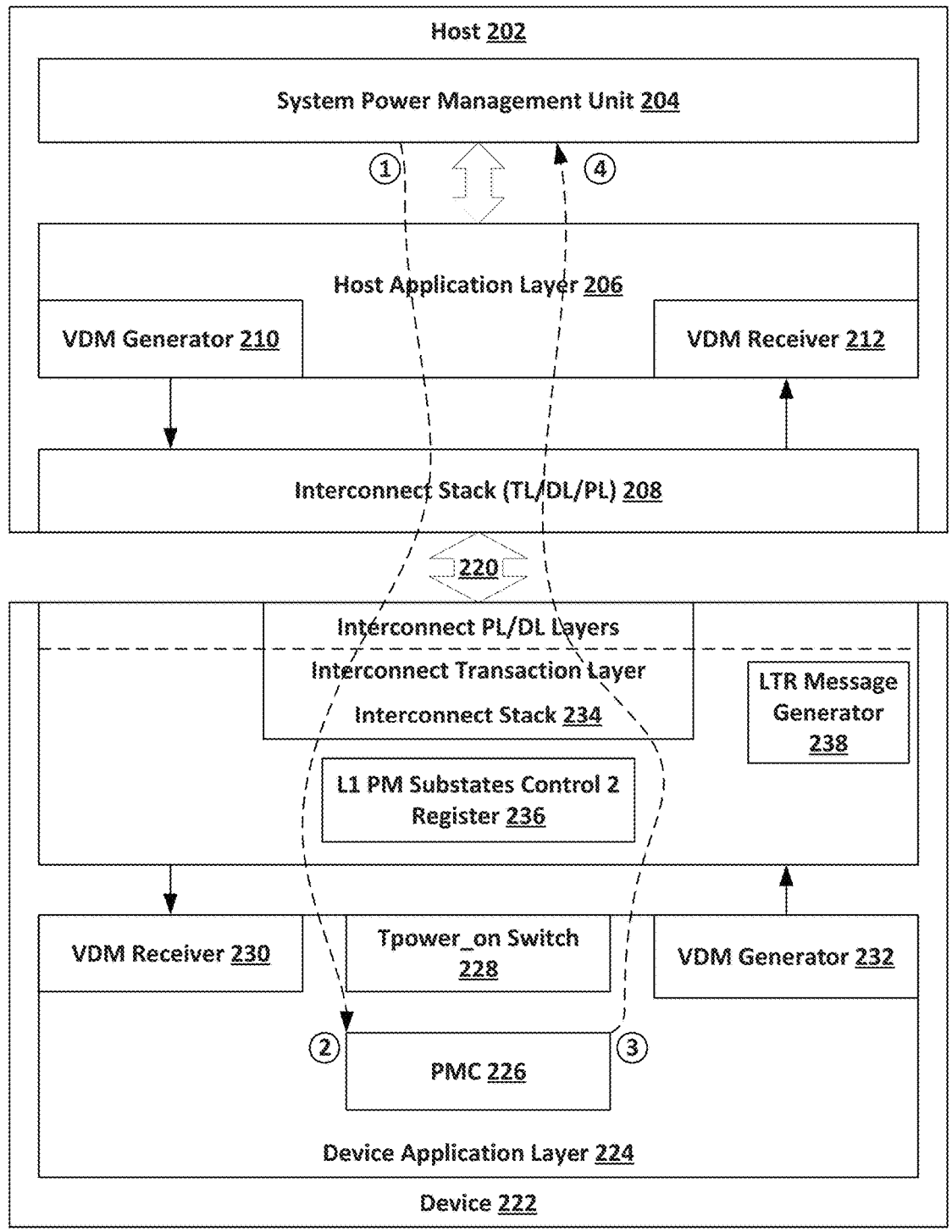
FIG. 4A is a schematic diagram of the system of FIG. 2 illustrating another example of system initialization for providing multiple wake-up time options in accordance with embodiments of the present disclosure.
Figure 4B:
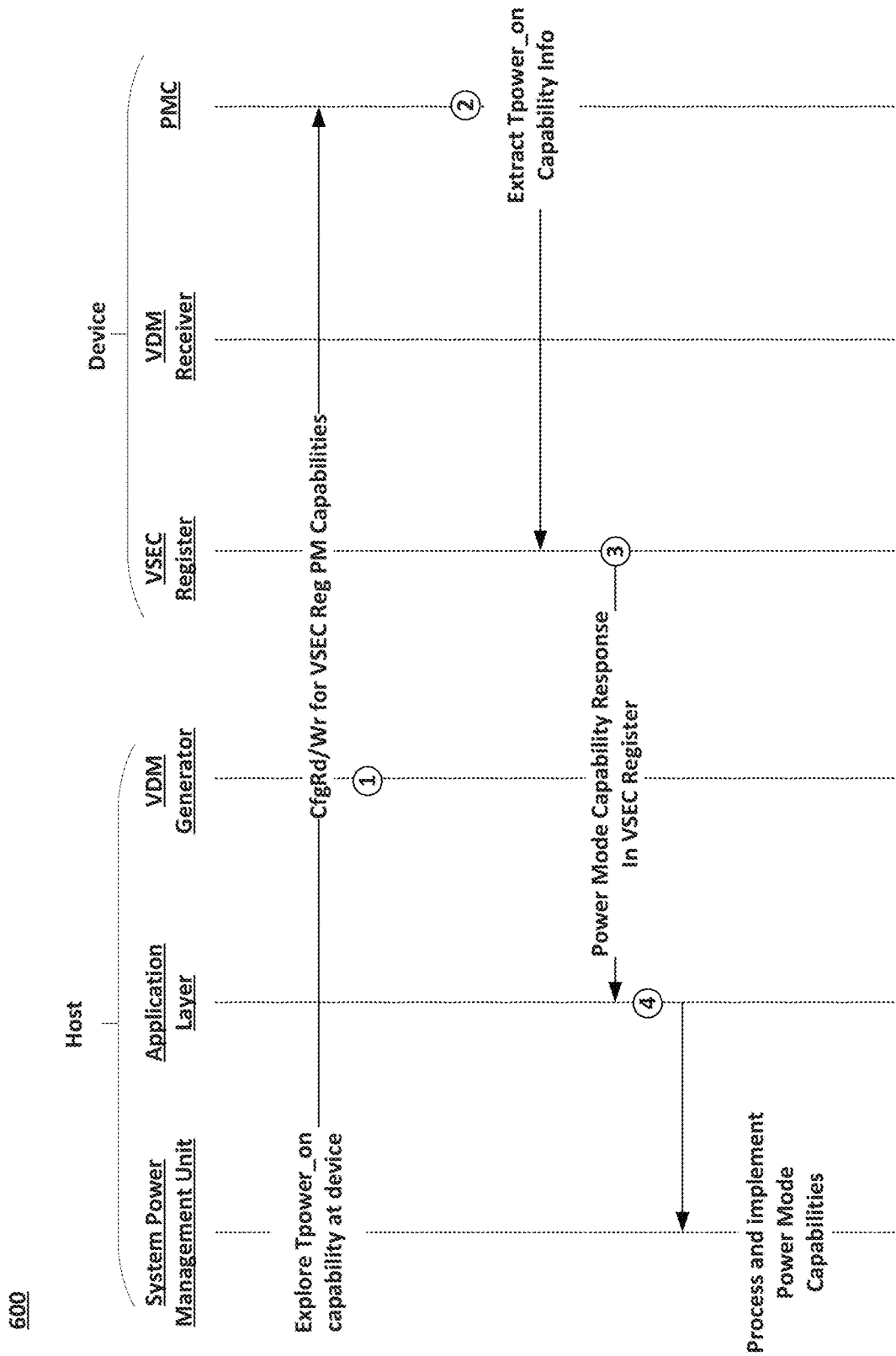
FIG. 4B is a swim lane diagram illustrating another example initialization procedure in accordance with embodiments of the present disclosure.

At the outset, it might be necessary in some implementations to perform system initialization. FIGS. 3A and 3B provide details of a first initialization process. FIGS. 4A and 4B provide details of a second initialization process.

FIG. 3A is a schematic diagram of system 200 illustrating system initialization for providing multiple wake-up time options in accordance with embodiments of the present disclosure. FIG. 3B is a swim lane diagram 400 illustrating an example initialization procedure in accordance with embodiments of the present disclosure. FIGS. 3A and 3B can be viewed together.

Figure 16:
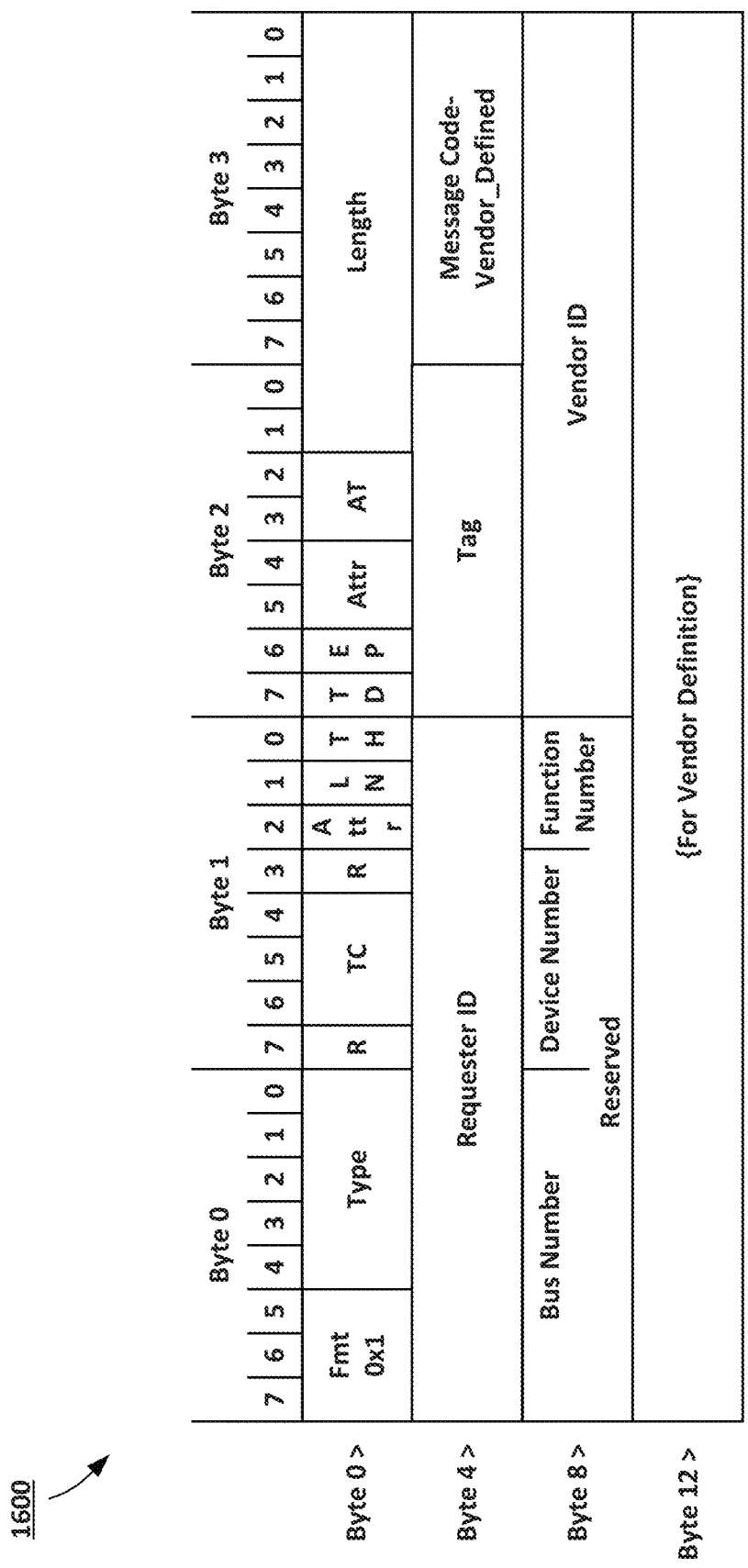
FIG. 16 is a schematic diagram of an example VDM frame in accordance with embodiments of the present disclosure.

In some embodiments, the system 200 can use a Vendor-Defined Message (VDM) for system initialization. (FIG. 16 is a schematic diagram of an example VDM frame 1600 in accordance with embodiments of the present disclosure.) As a general matter, the host 202 and device 222 can have an application layer agreement regarding how the Tpower_on timing information is packaged via a standard VDM packet. In addition and at the outset, the device 222 can implement a Tpower_on capability structure. Table 3 is one non-limiting example.

TABLE 3

| Example Tpower_on Capability Structure | | | | |
|---|---|---|---|---|
| L1.2 Substate Power Modes | Selected T_POWER_ON_SCALE | Selected T_POWER_ON_VALUE | Selected Tpower_on (μs) | Mode Entry Enable (Optional) |
| mode_1 | 01b | 10100b | 200 | 1 (by default) |
| mode_2 | 10b | 01010b | 1000 | 1 (by default) |
| ... | ... | ... | ... | ... |
| mode_n | 10b | 11111b | 3100 | 1 (by default) |

Given such an application layer agreement exists and is available, and the device has implemented a Tpower_on capability structure, one example system initialization process is provided:

1) After normal system boot-up, System Power Management Unit at host 202 starts exploring the additional Tpower_on capability at the device side by composing a Power Mode Capability Read Request message, such as that formatted as a VDM_PM_CAP_RD_REQ message. The Power Mode Capability Read Request message can be generated by the host's VDM generator 210.

2) The Power Mode Capability Read Request message is received by Device 222 interconnect layers, which in turn passes it to the device's VDM receiver 230 at application layer 206. The VDM receiver 230 has the knowledge (based on the agreement) of VDM_PM_CAP_RD_REQ framing rules, and extract the Tpower_on Capability information from the Tpower_on Capability Table 227 (which can be similar to Table 3 above). For example, there can be n settings of Tpower_on values in "Tpower_on Switch" for two L1.2 substate power modes, as shown in Table 3 above. Note that Table 3 is read-only from the host 202 perspective except column 5.

3) The device 222 passes the capability structure information to the VDM generator 232, which can construct a Power Mode Capability Read Response message, formatted as a VDM_PM_CAP_RD_RSP VDM message, as a completion message in response to the Power Mode Capability Read Request (VDM_PM_CAP_RD_REQ). The Power Mode Capability Read Response message can carry the power mode information to the host 202.

4) The Power Mode Capability Read Response message traverses across the PCIe link and layers and arrives at the host's VDM receiver 212 at the host application layer 203. Then the host application layer 206 will pass the acknowledge information to System Power Management Unit 204, which can implement the power modes carried by the Power Mode Capability Read Response.

In some embodiments, the Tpower_on Capability structure can be enhanced with a "mode entry enable" field, which the host 202 can configure to enable/disable certain mode options based on system power policy using additional type of VDM. An example of such a VDM is VDM_PM_CAP_CFG_REQ to set/clear certain "mode entry enable" field). This way, the device 222 can be "constrained" by the host 202 during either initialization or dynamic operation phase in terms of L1.2 substate power mode choices.

FIG. 4A is a schematic diagram of system illustrating another example of system initialization for providing multiple wake-up time options in accordance with embodiments of the present disclosure. FIG. 4B is a swim lane diagram illustrating another example initialization procedure in accordance with embodiments of the present disclosure. In some embodiments, the system 200 can use Vendor-Specific Extended Capability (VSEC) Registers for system initialization. Table 4 below illustrates an example Vendor-Specific Extended Capability (VSEC) Register.

TABLE 4

Example Vendor-Specific Extended Capability (VSEC) Register

| Bit Location | Register Description | Attributes |
|---|---|---|
| 15:0 | VSEC ID - This field is a vendor-defined ID number | RO |
| 19:16 | that indicates the nature and format of the VSEC structure. Software must qualify the Vendor ID before interpreting this field.<br>VSEC Rev - This field is a vendor-defined version number that indicates the version of the VSEC structure. Software must qualify the Vendor ID and VSEC ID before interpreting this field. | RO |
| 31:20 | VSEC Length - This field indicates the number of bytes in the entire VSEC structure, including the PCI Express Extended Capability header, the Vendor-Specific header, and the Vendor-Specific registers. | RO |

As VSEC length is not limited by standardization, the device 222 can implement sufficient R/W registers for as many power modes as necessary into this VSEC structure. In a similar way, the VSEC structure can be used to configure each entry of the power-mode mapping table in "Tpower_on switch" in FIG. 4A. When a host-device agreement is available, the device 222 can choose to leverage the device VSEC structure to implement the Tpower_on capability table structure similar to Table 3. As a result, the host can perform the similar initialization process to extract the Tpower-on Capability information via issuing standard CfgRd targeting the VSEC structure and pass the CplD information to System Power Management.

1) After normal system boot-up, System Power Management Unit 204 at host 202 starts exploring the additional Tpower_on capability at the device side by requesting an indication of power modes by transmitting a CfgRd message to the device 222 targeting the appropriate (as agreed upon) VSEC registers.

2) The CfgRd is received by Device 222 interconnect layers. The device can read the appropriate VSEC registers to extract power mode information.

3) The device 222 passes the power mode through interconnect layer to the host 202.

4) The host 202 can receive the power modes of the device 222 via standard CfgRd communications.

In some embodiments, system initialization can be skipped if both of the following two conditions are true:

A) the host 202 has the pre-knowledge of the device 222 application layer's proprietary Tpower_on capability structure, and B) the host 202 does not need to disable certain Tpower_on options that the device 222 provides. This way, in normal operation, the device 222 is allowed to freely choose any Tpower_on options for L1.2 substate.

Figure 5:
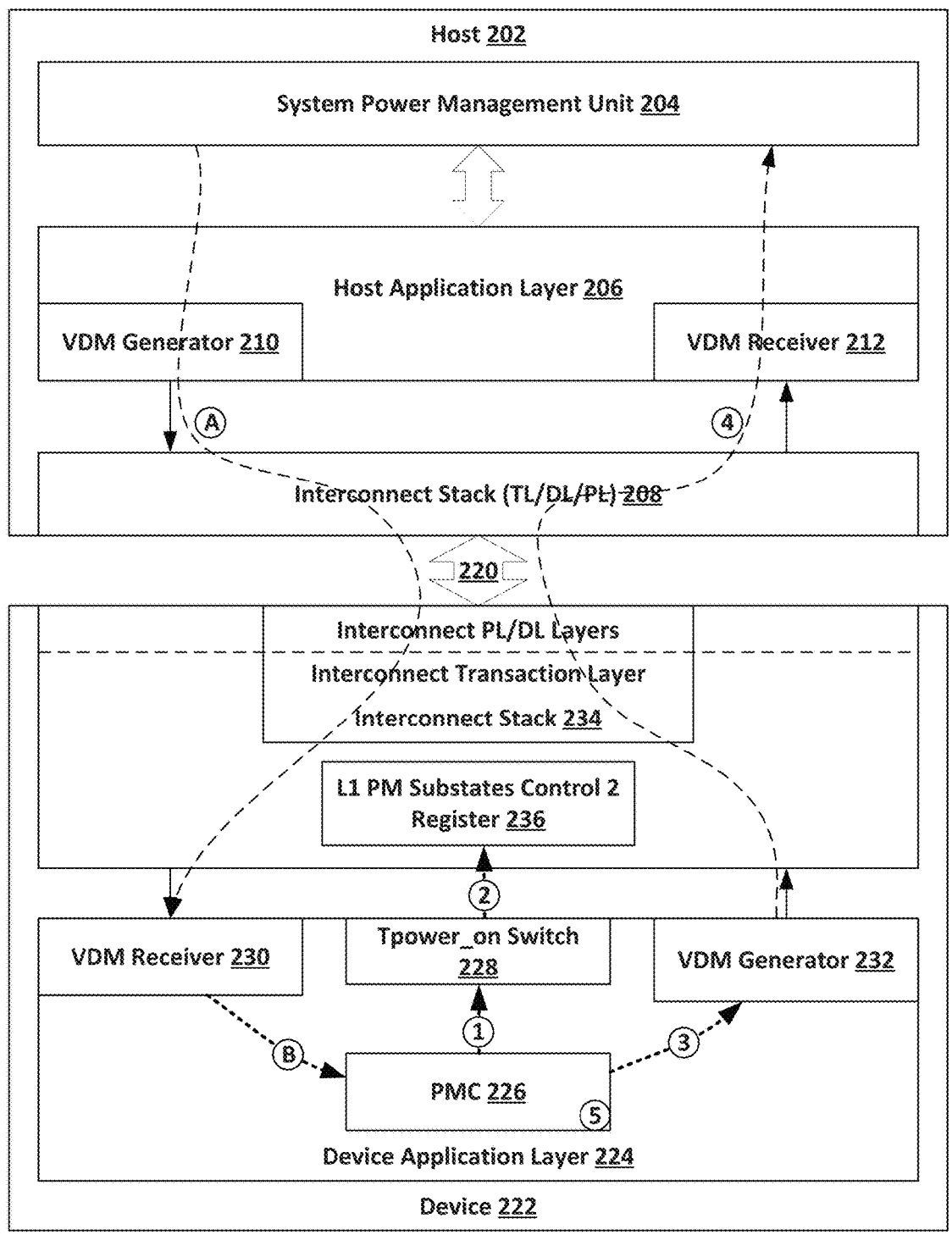
FIG. 5 is a schematic diagram of the system of FIG. 2 illustrating an example of a process flow for implementing multiple wake-up time options in accordance with embodiments of the present disclosure.
Figure 6:
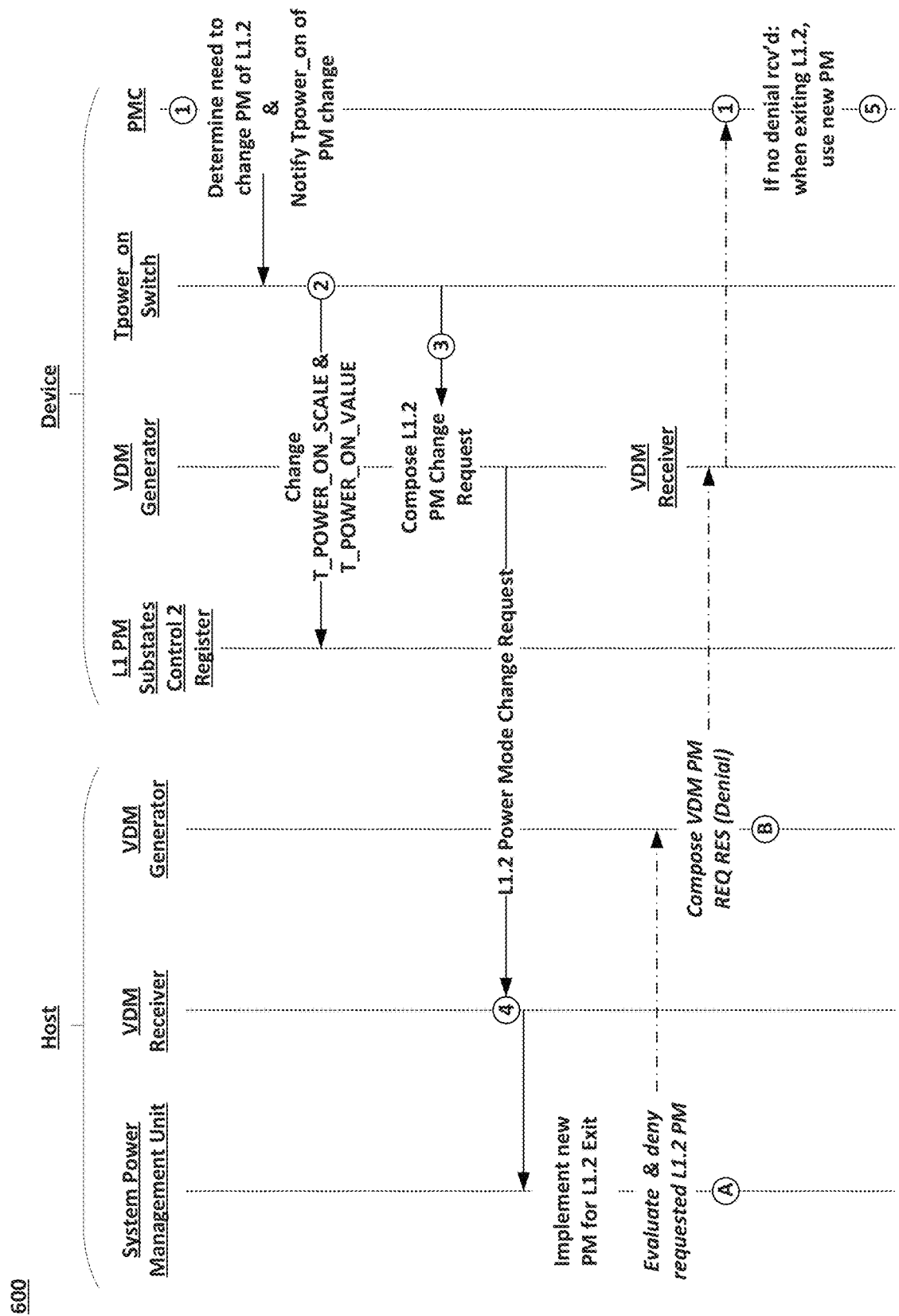
FIG. 6 is a swim lane diagram illustrating an example message flow between a host and a device for implementing multiple wake-up time options in accordance with embodiments of the present disclosure.

FIG. 5 is a schematic diagram of the system of FIG. 2 illustrating an example of a process flow for implementing multiple wake-up time options in accordance with embodiments of the present disclosure. FIG. 6 is a swim lane diagram 600 illustrating an example message flow between a host and a device for implementing multiple wake-up time options in accordance with embodiments of the present disclosure. FIGS. 5 and 6 can be viewed together for clarity. In general, this first example embodiment uses Vendor-Defined Messages (VDM) for the device 222 to advertise L1.2 substate power modes. It is assumed that the device's 222 L1.2 features (be it ASPM or PM L1.2 substates) are enabled by the host 202.

1) The Device Power Management Controller (PMC) 226 determines out there is a need to change its power mode of L1.2 substate. In the example described below, the PMC 226 elects or determines a need to change to PM mode_2 in Table 3, and notifies the Tpower_on switch 228 for the change.

2) When the PMC updates the Tpower_on Switch 228 to mode_2, the update drives the Tpower_on Switch to change the "T_POWER_ON_SCALE" and "T_POWER_ON_VALUE" in the L1 PM Substates Control 2 Register 236. There are many ways for application layer to update the PCIe stack registers. One example is to override the value that was originally configured by the host 202 during normal enumeration, but it is not limited to it; other mechanisms are contemplated by this disclosure.

3) Meanwhile, PMC 226 passes the selected mode_2 to the Device VDM generator 232. VDM generator 232 can compose a VDM_PM_REQ as a "L1.2 Power Mode change request" with the mode_2 information.

4) The VDM_PM_REQ is sent out to the host. The new Power Mode value can be conveyed via any byte in "Byte12~Byte15" in FIG. 16. The VDM_PM_REQ carrying the mode_2 setting information is received by the Host PCIe layers 228, which in turn passes it to the VDM receiver 212 at Host application layer 206. The VDM receiver 212 has the knowledge (based on the agreement) of VDM_PM_REQ framing rules, and decodes the VDM_PM_REQ to extract the Power Mode value setting information before passing the PM value on to the System Power Management Unit 204, which concludes the Power Mode change process.

5) The device 222 at some point may enter the L1.2 substate. After entering the L1.2 substate, when the device 222 starts exiting L1.2, the exiting time will conform to what the device 222 had requested, as in this "mode_2" example, 1000 microseconds.

Optionally, between step 4) and 5), the System Power Management Unit 204 can optionally evaluate the mode_2 change impact based on system knowledge of power, latency, or performance, and if necessary, the System Power Management Unit 204 can deny the change request by instructing the host VDM generator 210 to compose a VDM_PM_REQ_RSP indicating a denial of the PM change, and to send the VDM_PM_REQ_RSP back to the device 222. In embodiments that use this optional device PMC 226 would to wait for "VDM_PM_REQ_RSP" to see if its request gets granted or not.

In this case, the step A) and B) is shown in FIG. 5 to illustrate the handshake. If the mode change request is denied by the host 202, the PMC 226 restarts from step 1) to pick up a different mode to get final grant from the host 202.

In addition, step A) and B) may be saved if during system initialization process the host 202 chooses to disable certain modes by setting the "mode entry enable" field in Table 3. This way, the mode selected by the device 222 to construct VDM_PM_REQ will be compliant to system power policy requirements.

This efficiency of the VDM-based process increases as more power modes (and more Tpower_on parameters) are used by the device 222.

Figure 7:
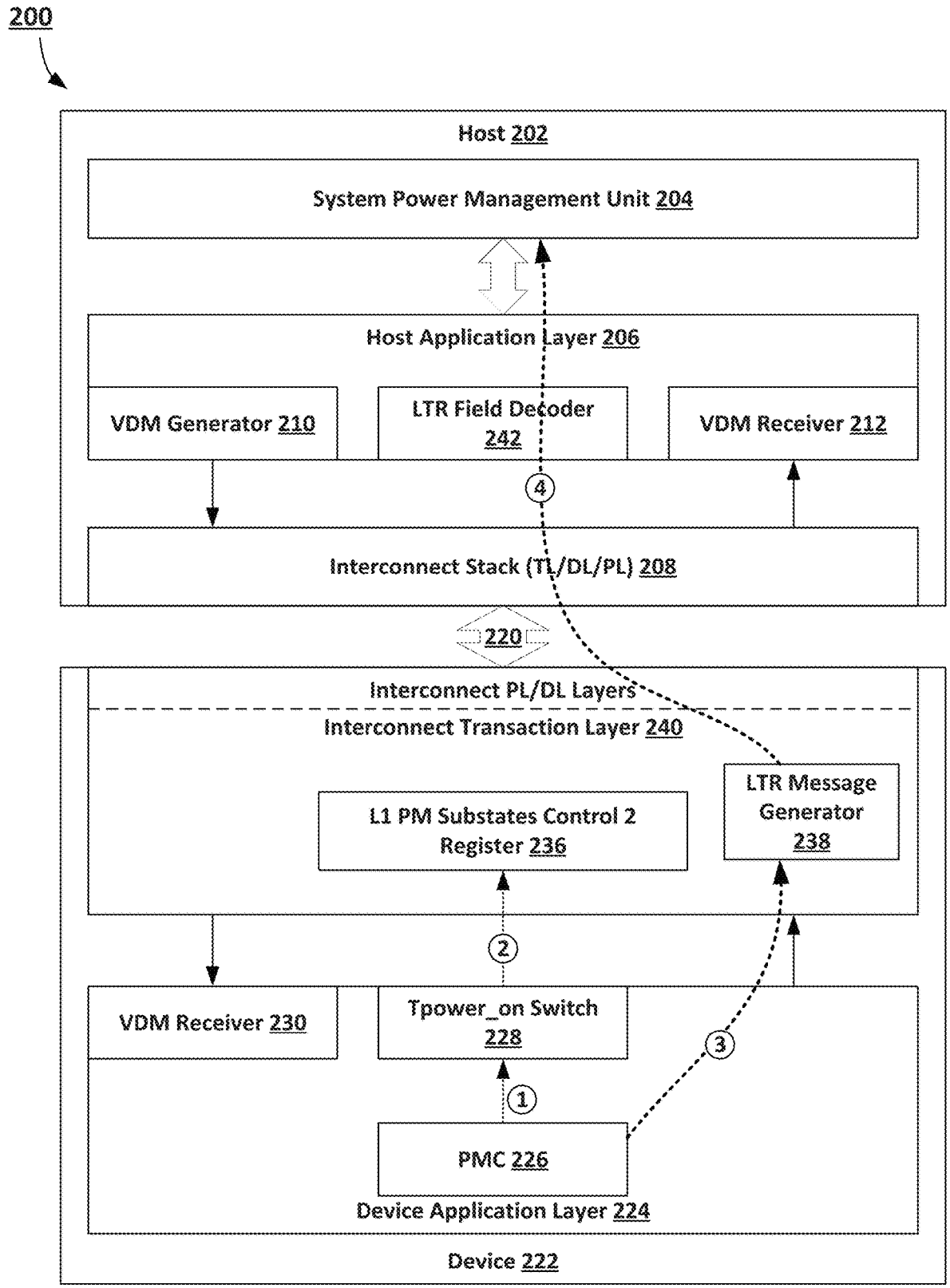
FIG. 7 is a schematic diagram of the system of FIG. 2 illustrating another example of a process flow for providing multiple wake-up time options in accordance with embodiments of the present disclosure.
Figure 8:
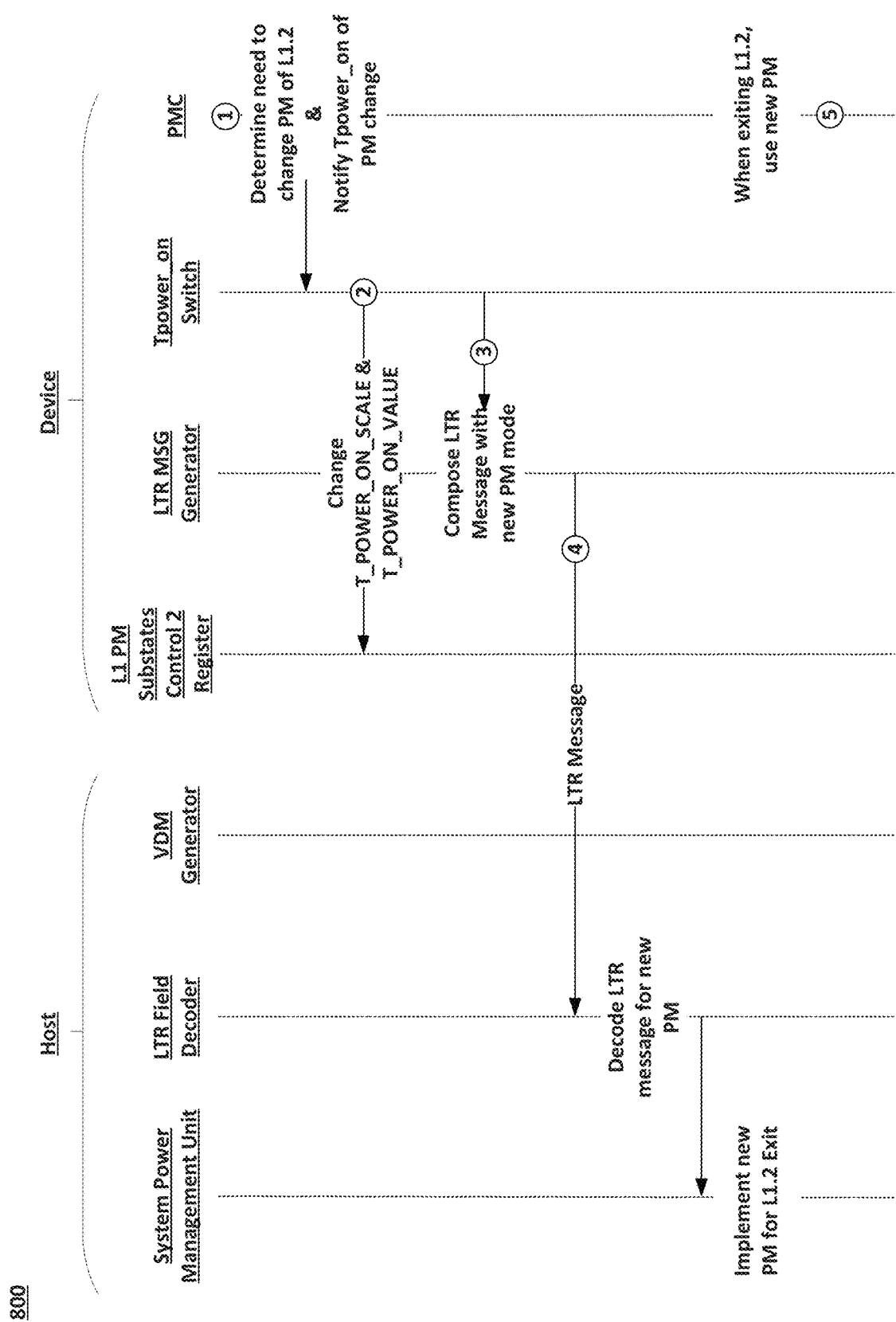
FIG. 8 is a swim lane diagram illustrating another example message flow between a host and a device for implementing multiple wake-up time options in accordance with embodiments of the present disclosure.
Figure 17:
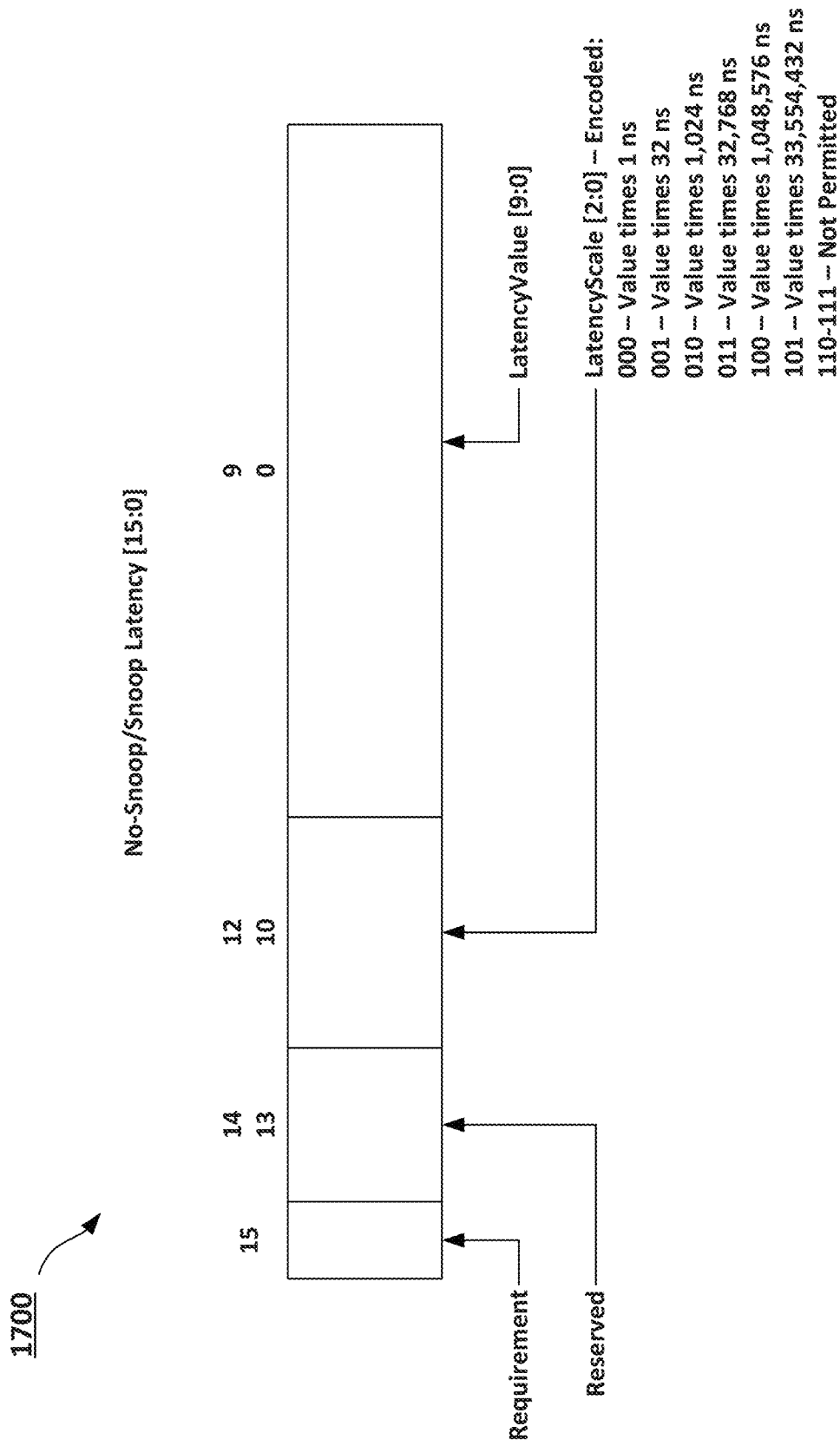
FIG. 17 is a schematic diagram of example Latency Fields Formats for Latency Tolerance Reporting Messages in accordance with embodiments of the present disclosure.

FIG. 7 is a schematic diagram of the system of FIG. 2 illustrating another example of a process flow for providing multiple wake-up time options in accordance with embodiments of the present disclosure. FIG. 8 is a swim lane diagram illustrating another example message flow between a host and a device for implementing multiple wake-up time options in accordance with embodiments of the present disclosure. FIGS. 7 and 8 can be viewed together for clarity. FIGS. 7 and 8 describe a process that uses a Latency Tolerance Reporting (LTR) Message for the device 222 to advertise L1.2 substate power modes. FIG. 17 is a schematic diagram that illustrates LTR Message fields defined by PCIe Specification. The process of FIGS. 7 and 8 involve repurposing the scale field to include the information for the power-mode encoding (e.g., Tpower value to use). Per PCIe specification: If the Requirement bit is Clear, there is no latency requirement and the LatencyValue and LatencyScale fields are ignored. Therefore, the LTR process described herein is to overload the "LatencyValue" and "LatencyScale" fields while keeping the "Requirement" field as Clear.

1) The Device Power Management Controller (PMC) 226 finds out there is a need to change its power mode of L1.2 substate. In the example described below, the PMC 226 elects or determines a need to change to PM mode_2 in Table 3, and notifies the Tpower_on switch 228 for the change.

2) When the PMC updates the Tpower_on Switch 228 to mode_2, the update drives the Tpower_on Switch to change the "T_POWER_ON_SCALE" and "T_POWER_ON_VALUE" in the L1 PM Substates Control 2 Register 236. There are many ways for application layer to update the PCIe stack registers. One example is to override the value that was originally configured by the host 202 during normal enumeration, but it is not limited to it; other mechanisms are contemplated by this disclosure.

3) The PMC 226 passes the selected mode_2 to the LTR Message generator in Device PCIe TL layer 240, which in turn composes a LTR Message with following fields values:
Requirement field is Clear (as 0)
Rest of the fields are repurposed for conveying the new mode_2 information. For example, the LatencyScale[2:0] Field can be used to carry a mode_2 value, provided that there are up to 8 modes supported by the device 222.

4) The LTR Message carrying the "mode_2" setting information is received by the Host PCIe layers 208, which extracts the raw LTR field values and passes it to the LTR field decoder 242 at Host application layer 206. The LTR field decoder 242 has the knowledge (based on the host-device agreement) of the repurposed LTR field definitions. The LTR field decoder 242 can decode the LTR message to extract the Power Mode value setting information before passing it on to the System Power Management Unit 204, which concludes the Power Mode change process.

5) The device 222 will start L1 negotiation on the link, and then enter L1.2 substate. After entering L1.2 substate, when the device 222 starts exiting L1.2, the exiting time will conform to what the device 222 had requested, as in this "mode_2" example, 1000 microseconds.

An advantage of the LTR process is that normally, an LTR Message with "Requirement" field as Clear will have to be sent out anyway prior to related L1 and L1 substate entry. By reusing the must-send LTR before the low-power transition, it provides an efficient way to convey the L1.2 exiting time information.

Notably, the device (or endpoint) is the device that determines when to enter low power state; exit of low power state is spec compliant, which means that either the device or host can exit the L1.2 substate.

Figure 9:
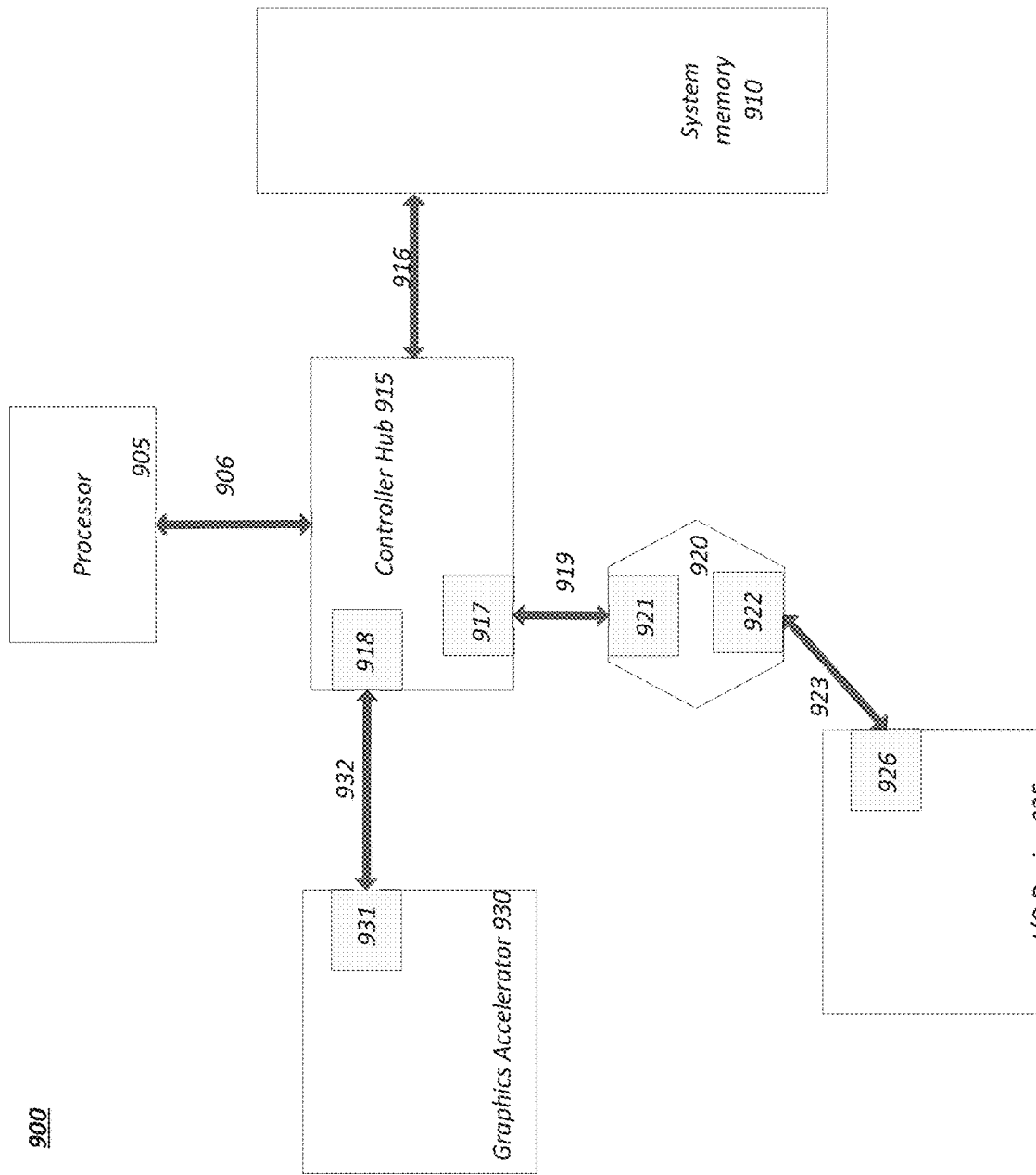
FIG. 9 illustrates an embodiment of a computing system including an interconnect architecture.

Referring to FIG. 9, an embodiment of a fabric composed of point-to-point Links that interconnect a set of components is illustrated. System 900 includes processor 905 and system memory 910 coupled to controller hub 915. Processor 905 includes any processing element, such as a microprocessor, a host processor, an embedded processor, a co-processor, or other processor. Processor 905 is coupled to controller hub 915 through front-side bus (FSB) 906. In one embodiment, FSB 906 is a serial point-to-point interconnect as described below. In another embodiment, link 906 includes a serial, differential interconnect architecture that is compliant with different interconnect standard.

System memory 910 includes any memory device, such as random access memory (RAM), non-volatile (NV) memory, or other memory accessible by devices in system 900. System memory 910 is coupled to controller hub 915 through memory interface 916. Examples of a memory interface include a double-data rate (DDR) memory interface, a dual-channel DDR memory interface, and a dynamic RAM (DRAM) memory interface.

In one embodiment, controller hub 915 is a root hub, root complex, or root controller in a Peripheral Component Interconnect Express (PCIe or PCIE) interconnection hierarchy. Examples of controller hub 915 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 905, while controller 915 is to communicate with I/O devices, in a similar manner as described below. In some embodiments, peer-to-peer routing is optionally supported through root complex 915.

Here, controller hub 915 is coupled to switch/bridge 920 through serial link 919. Input/output modules 917 and 921, which may also be referred to as interfaces/ports 917 and 921, include/implement a layered protocol stack to provide communication between controller hub 915 and switch 920. In one embodiment, multiple devices are capable of being coupled to switch 920.

Switch/bridge 920 routes packets/messages from device 925 upstream, i.e. up a hierarchy towards a root complex, to controller hub 915 and downstream, i.e. down a hierarchy away from a root controller, from processor 905 or system memory 910 to device 925. Switch 920, in one embodiment, is referred to as a logical assembly of multiple virtual PCI-to-PCI bridge devices. Device 925 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 925 may include a PCIe to PCI/PCI-X bridge to support legacy or other version PCI devices. Endpoint devices in PCIe are often classified as legacy, PCIe, or root complex integrated endpoints.

Graphics accelerator 930 is also coupled to controller hub 915 through serial link 932. In one embodiment, graphics accelerator 930 is coupled to an MCH, which is coupled to an ICH. Switch 920, and accordingly I/O device 925, is then coupled to the ICH. I/O modules 931 and 918 are also to implement a layered protocol stack to communicate between graphics accelerator 930 and controller hub 915. Similar to the MCH discussion above, a graphics controller or the graphics accelerator 930 itself may be integrated in processor 905.

Figure 10:
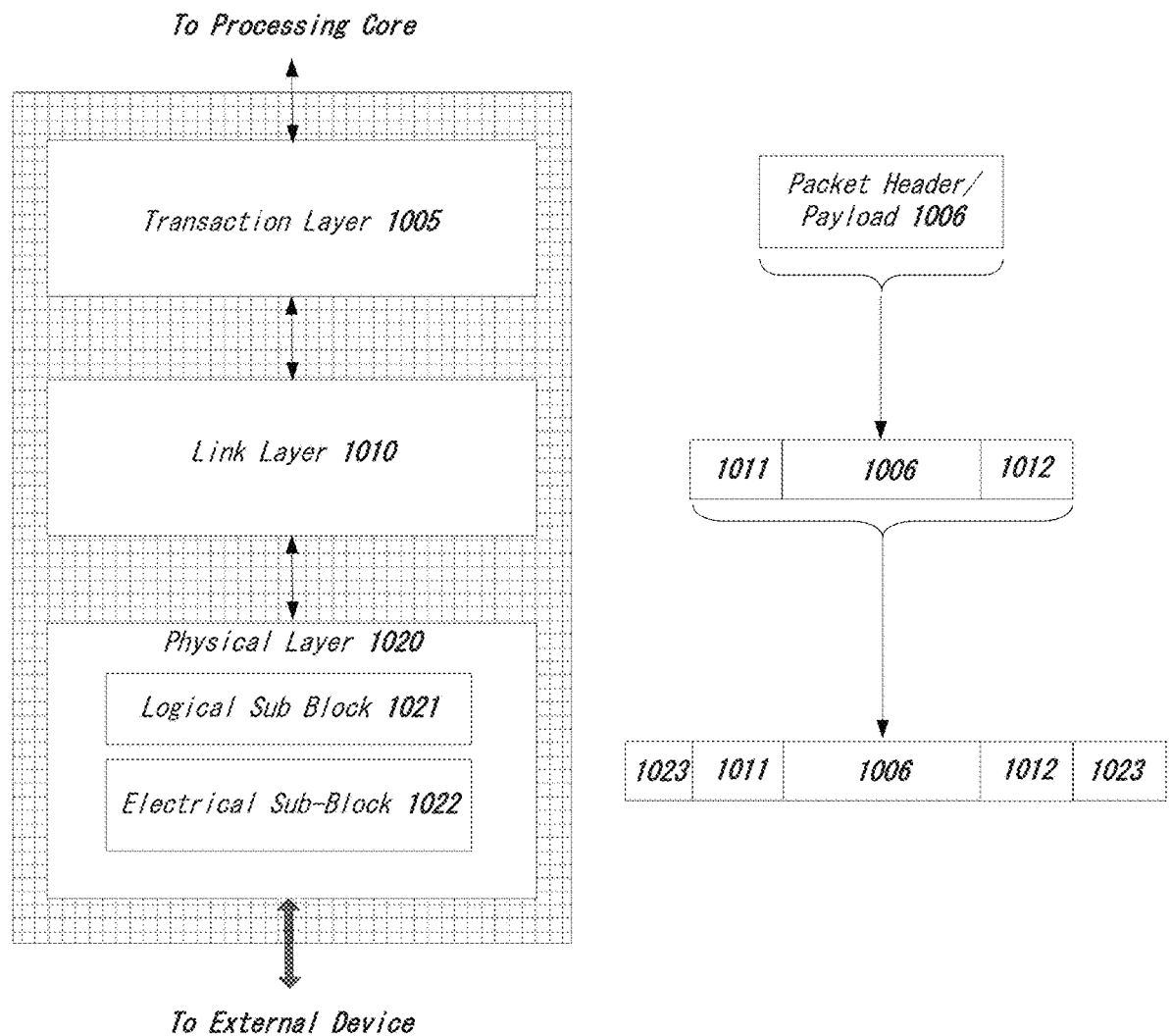
FIG. 10 illustrates an embodiment of a interconnect architecture including a layered stack.

Turning to FIG. 10 an embodiment of a layered protocol stack is illustrated. Layered protocol stack 1000 includes any form of a layered communication stack, such as a Quick Path Interconnect (QPI) stack, a PCie stack, a next generation high performance computing interconnect stack, or other layered stack. Although the discussion immediately below in reference to FIGS. 9-12 are in relation to a PCIe stack, the same concepts may be applied to other interconnect stacks. In one embodiment, protocol stack 1000 is a PCIe protocol stack including transaction layer 1005, link layer 1010, and physical layer 1020. An interface, such as interfaces 917, 918, 921, 922, 926, and 931 in FIG. 1, may be represented as communication protocol stack 1000. Representation as a communication protocol stack may also be referred to as a module or interface implementing/including a protocol stack.

PCI Express uses packets to communicate information between components. Packets are formed in the Transaction Layer 1005 and Data Link Layer 1010 to carry the information from the transmitting component to the receiving component. As the transmitted packets flow through the other layers, they are extended with additional information necessary to handle packets at those layers. At the receiving side the reverse process occurs and packets get transformed from their Physical Layer 1020 representation to the Data Link Layer 1010 representation and finally (for Transaction Layer Packets) to the form that can be processed by the Transaction Layer 1005 of the receiving device.

Transaction Layer

In one embodiment, transaction layer 1005 is to provide an interface between a device's processing core and the interconnect architecture, such as data link layer 1010 and physical layer 1020. In this regard, a primary responsibility of the transaction layer 1005 is the assembly and disassembly of packets (i.e., transaction layer packets, or TLPs). The translation layer 1005 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 1005. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 1005 assembles packet header/payload 1006. Format for current packet headers/payloads may be found in the PCIe specification at the PCIe specification website.

Figure 11:
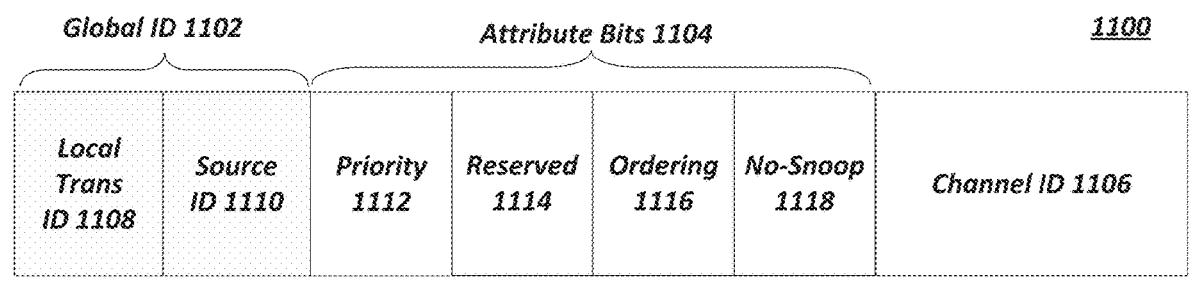
FIG. 11 illustrates an embodiment of a request or packet to be generated or received within an interconnect architecture.

Quickly referring to FIG. 11, an embodiment of a PCIe transaction descriptor is illustrated. In one embodiment, transaction descriptor 1100 is a mechanism for carrying transaction information. In this regard, transaction descriptor 1100 supports identification of transactions in a system. Other potential uses include tracking modifications of default transaction ordering and association of transaction with channels.

Transaction descriptor 1100 includes global identifier field 1102, attributes field 1104 and channel identifier field 1106. In the illustrated example, global identifier field 1102 is depicted comprising local transaction identifier field 1108 and source identifier field 1110. In one embodiment, global transaction identifier 1102 is unique for all outstanding requests.

According to one implementation, local transaction identifier field 1108 is a field generated by a requesting agent, and it is unique for all outstanding requests that require a completion for that requesting agent. Furthermore, in this example, source identifier 1110 uniquely identifies the requestor agent within a PCIe hierarchy. Accordingly, together with source ID 1110, local transaction identifier 1108 field provides global identification of a transaction within a hierarchy domain.

Attributes field 1104 specifies characteristics and relationships of the transaction. In this regard, attributes field 1104 is potentially used to provide additional information that allows modification of the default handling of transactions. In one embodiment, attributes field 1104 includes priority field 1112, reserved field 1114, ordering field 1116, and no-snoop field 1118. Here, priority sub-field 1112 may be modified by an initiator to assign a priority to the transaction. Reserved attribute field 1114 is left reserved for future, or vendor-defined usage. Possible usage models using priority or security attributes may be implemented using the reserved attribute field.

In this example, ordering attribute field 1116 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 1118 is utilized to determine if transactions are snooped. As shown, channel ID Field 1106 identifies a channel that a transaction is associated with.

Link Layer

Link layer 1010, also referred to as data link layer 1010, acts as an intermediate stage between transaction layer 1005 and the physical layer 1020. In one embodiment, a responsibility of the data link layer 1010 is providing a reliable mechanism for exchanging Transaction Layer Packets (TLPs) between two components a link. One side of the Data Link Layer 1010 accepts TLPs assembled by the Transaction Layer 1005, applies packet sequence identifier 1011, i.e. an identification number or packet number, calculates and applies an error detection code, i.e. CRC 1012, and submits the modified TLPs to the Physical Layer 1020 for transmission across a physical to an external device.

Physical Layer

In one embodiment, physical layer 1020 includes logical sub block 1021 and electrical sub-block 1022 to physically transmit a packet to an external device. Here, logical sub-block 1021 is responsible for the "digital" functions of Physical Layer 1021. In this regard, the logical sub-block includes a transmit section to prepare outgoing information for transmission by physical sub-block 1022, and a receiver section to identify and prepare received information before passing it to the Link Layer 1010.

Physical block 1022 includes a transmitter and a receiver. The transmitter is supplied by logical sub-block 1021 with symbols, which the transmitter serializes and transmits onto to an external device. The receiver is supplied with serialized symbols from an external device and transforms the received signals into a bit-stream. The bit-stream is de-serialized and supplied to logical sub-block 1021. In one embodiment, an 8b/10b transmission code is employed, where ten-bit symbols are transmitted/received. Here, special symbols are used to frame a packet with frames 1023. In addition, in one example, the receiver also provides a symbol clock recovered from the incoming serial stream.

As stated above, although transaction layer 1005, link layer 1010, and physical layer 1020 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 12:
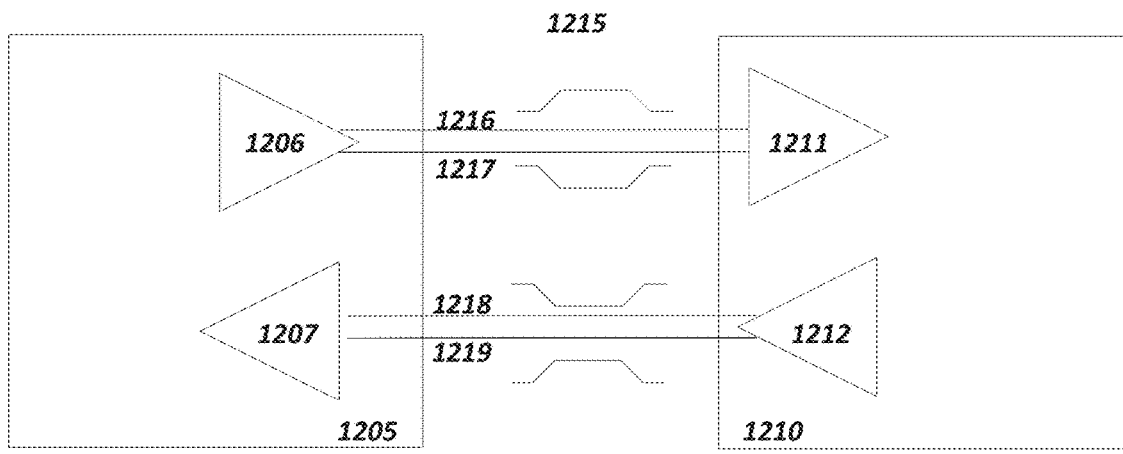
FIG. 12 illustrates an embodiment of a transmitter and receiver pair for an interconnect architecture.

Referring next to FIG. 12, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 1206/1211 and a receive pair 1212/1207. Accordingly, device 1205 includes transmission logic 1206 to transmit data to device 1210 and receiving logic 1207 to receive data from device 1210. In other words, two transmitting paths, i.e. paths 1216 and 1217, and two receiving paths, i.e. paths 1218 and 1219, are included in a PCIe link.

A transmission path refers to any path for transmitting data, such as a transmission line, a copper line, an optical line, a wireless communication channel, an infrared communication link, or other communication path. A connection between two devices, such as device 1205 and device 1210, is referred to as a link, such as link 415. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. crosscoupling, voltage overshoot/undershoot, ringing, etc. This allows for better timing window, which enables faster transmission frequencies.

Figure 13:
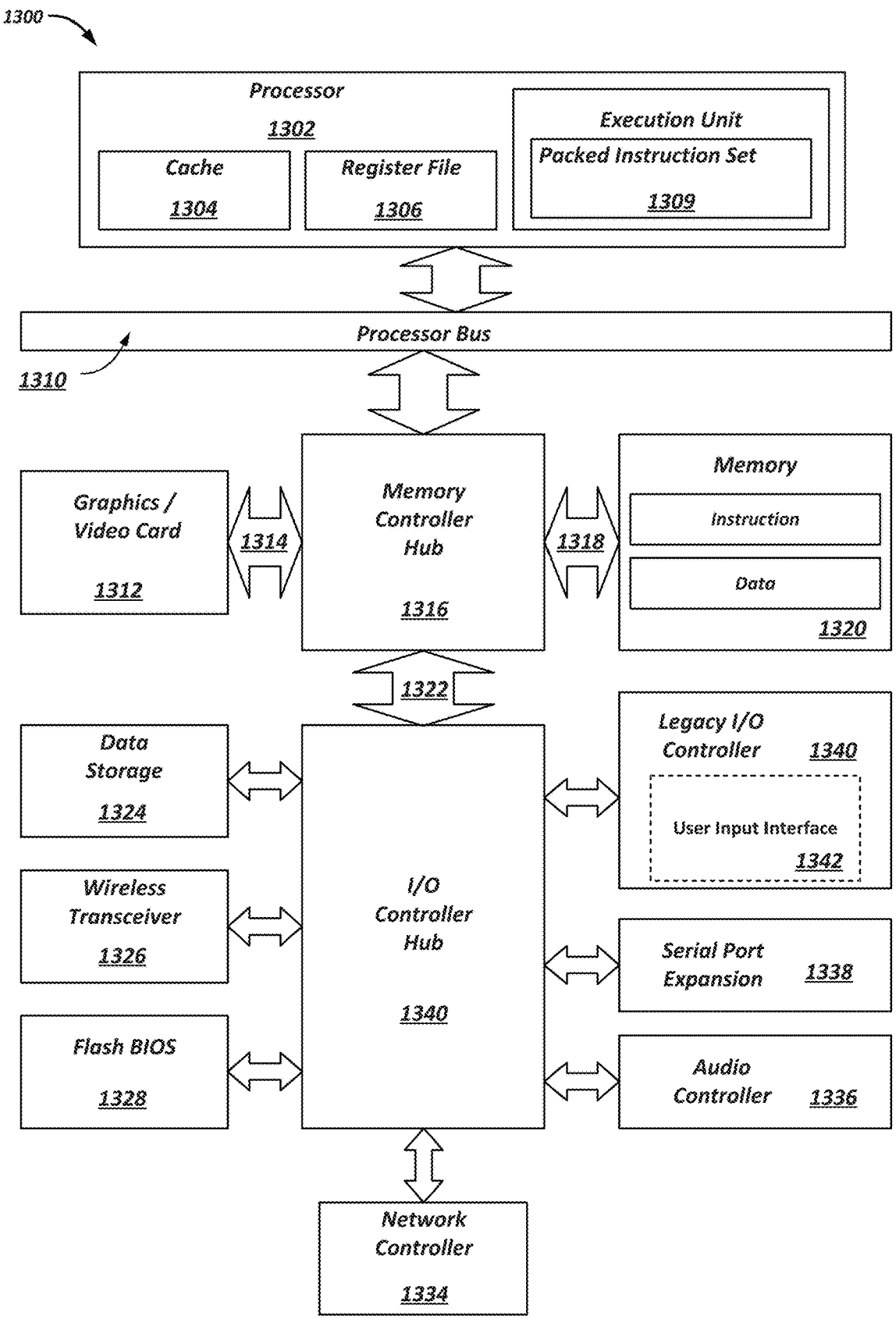
FIG. 13 illustrates another embodiment of a block diagram for a computing system including a processor.

Turning to FIG. 13, a block diagram of an exemplary computer system formed with a processor that includes execution units to execute an instruction, where one or more of the interconnects implement one or more features in accordance with one embodiment of the present disclosure is illustrated. System 1300 includes a component, such as a processor 1302 to employ execution units including logic to perform algorithms for process data, in accordance with the present disclosure, such as in the embodiment described herein. System 1300 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 1300 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present disclosure are not limited to any specific combination of hardware circuitry and software.

Embodiments are not limited to computer systems. Alternative embodiments of the present disclosure can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 1302 includes one or more execution units 1308 to implement an algorithm that is to perform at least one instruction. One embodiment may be described in the context of a single processor desktop or server system, but alternative embodiments may be included in a multiprocessor system. System 1300 is an example of a 'hub' system architecture. The computer system 1300 includes a processor 1302 to process data signals. The processor 1302, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 1302 is coupled to a processor bus 1310 that transmits data signals between the processor 1302 and other components in the system 1300. The elements of system 1300 (e.g. graphics accelerator 1312, memory controller hub 1316, memory 1320, I/O controller hub 1324, wireless transceiver 1326, Flash BIOS 1328, Network controller 1334, Audio controller 1336, Serial expansion port 1338, I/O controller 1340, etc.) perform their conventional functions that are well known to those familiar with the art.

In one embodiment, the processor 1302 includes a Level 1 (L1) internal cache memory 1304. Depending on the architecture, the processor 1302 may have a single internal cache or multiple levels of internal caches. Other embodiments include a combination of both internal and external caches depending on the particular implementation and needs. Register file 1306 is to store different types of data in various registers including integer registers, floating point registers, vector registers, banked registers, shadow registers, checkpoint registers, status registers, and instruction pointer register.

Execution unit 1308, including logic to perform integer and floating point operations, also resides in the processor 1302. The processor 1302, in one embodiment, includes a microcode (ucode) ROM to store microcode, which when executed, is to perform algorithms for certain macroinstructions or handle complex scenarios. Here, microcode is potentially updateable to handle logic bugs/fixes for processor 1302. For one embodiment, execution unit 1308 includes logic to handle a packed instruction set 1309. By including the packed instruction set 1309 in the instruction set of a general-purpose processor 1302, along with associated circuitry to execute the instructions, the operations used by many multimedia applications may be performed using packed data in a general-purpose processor 1302. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 1308 may also be used in micro controllers, embedded processors, graphics devices, DSPs, and other types of logic circuits. System 1300 includes a memory 1320. Memory 1320 includes a dynamic random access memory (DRAM) device, a static random access memory (SRAM) device, flash memory device, or other memory device. Memory 1320 stores instructions and/or data represented by data signals that are to be executed by the processor 1302.

Note that any of the aforementioned features or aspects of the disclosure may be utilized on one or more interconnect illustrated in FIG. 13. For example, an on-die interconnect (ODI), which is not shown, for coupling internal units of processor 1302 implements one or more aspects of the disclosure described above. Or the disclosure is associated with a processor bus 1310 (e.g. Intel Quick Path Interconnect (QPI) or other known high performance computing interconnect), a high bandwidth memory path 1318 to memory 1320, a point-to-point link to graphics accelerator 1312 (e.g. a Peripheral Component Interconnect express (PCIe) compliant fabric), a controller hub interconnect 1322, an I/O or other interconnect (e.g. USB, PCI, PCIe) for coupling the other illustrated components. Some examples of such components include the audio controller 1336, firmware hub (flash BIOS) 1328, wireless transceiver 1326, data storage 1324, legacy I/O controller 1310 containing user input and keyboard interfaces 1342, a serial expansion port 1338 such as Universal Serial Bus (USB), and a network controller 1334. The data storage device 1324 can comprise a hard disk drive, a floppy disk drive, a CD-ROM device, a flash memory device, or other mass storage device.

Figure 14:
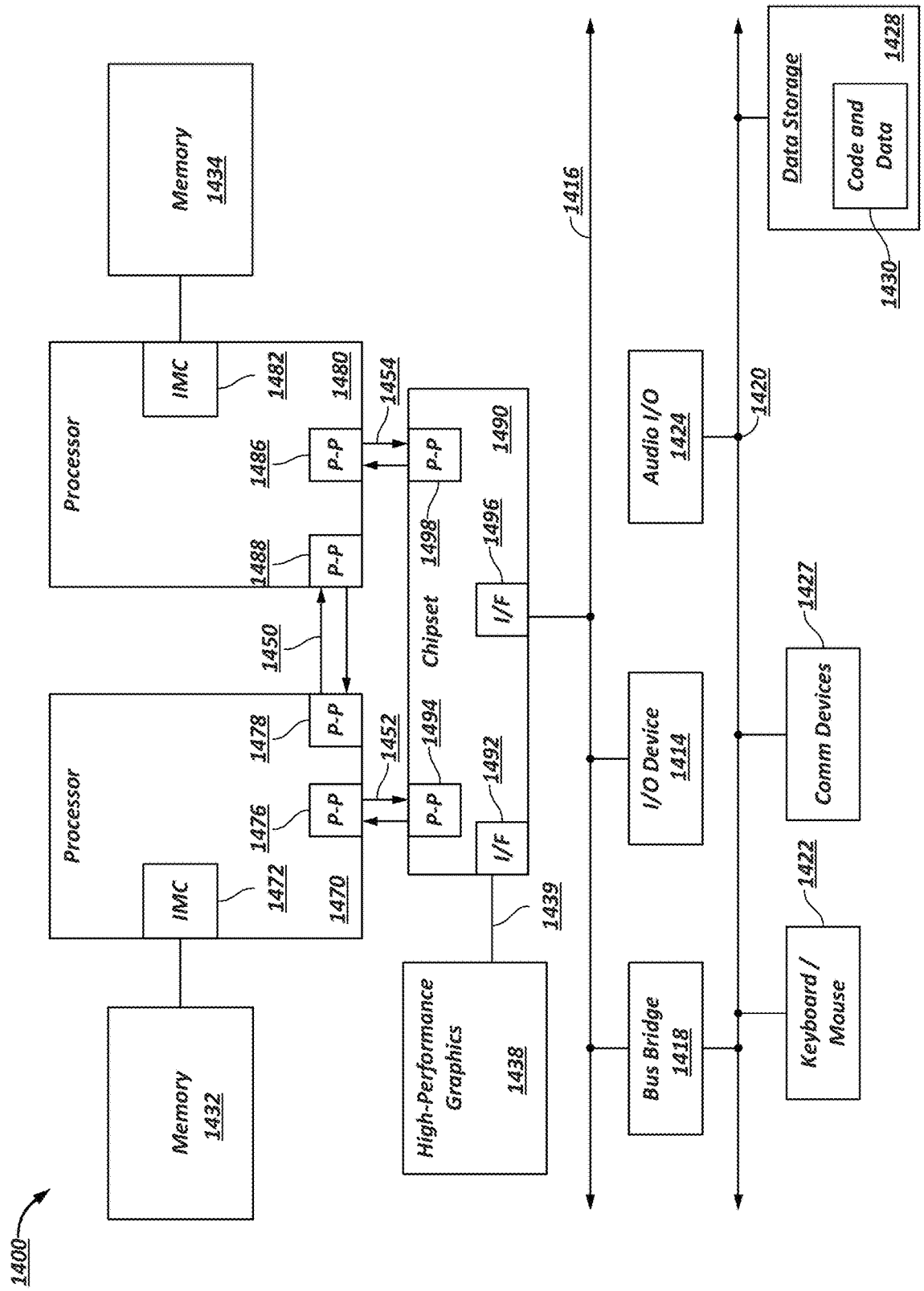
FIG. 14 illustrates an embodiment of a block for a computing system including multiple processor sockets.

Referring now to FIG. 14, shown is a block diagram of a second system 1400 in accordance with an embodiment of the present disclosure. As shown in FIG. 14, multiprocessor system 1400 is a point-to-point interconnect system, and includes a first processor 1470 and a second processor 1480 coupled via a point-to-point interconnect 1450. Each of processors 1470 and 1480 may be some version of a processor. In one embodiment, 1452 and 1454 are part of a serial, point-to-point coherent interconnect fabric, such as Intel's Quick Path Interconnect (QPI) architecture. As a result, the disclosure may be implemented within the QPI architecture.

While shown with only two processors 1470, 1480, it is to be understood that the scope of the present disclosure is not so limited. In other embodiments, one or more additional processors may be present in a given processor.

Processors 1470 and 1480 are shown including integrated memory controller units 1472 and 1482, respectively. Processor 1470 also includes as part of its bus controller units point-to-point (P-P) interfaces 1476 and 1478; similarly, second processor 1480 includes P-P interfaces 1486 and 1488. Processors 1470, 1480 may exchange information via a point-to-point (P-P) interface 1450 using P-P interface circuits 1478, 1488. As shown in FIG. 14, IMCs 1472 and 1482 couple the processors to respective memories, namely a memory 1432 and a memory 1434, which may be portions of main memory locally attached to the respective processors.

Processors 1470, 1480 each exchange information with a chipset 1490 via individual P-P interfaces 1452, 1454 using point to point interface circuits 1476, 1494, 1486, 1498. Chipset 1490 also exchanges information with a high-performance graphics circuit 1438 via an interface circuit 1492 along a high-performance graphics interconnect 1439.

A shared cache (not shown) may be included in either processor or outside of both processors; yet connected with the processors via P-P interconnect, such that either or both processors' local cache information may be stored in the shared cache if a processor is placed into a low power mode.

Chipset 1490 may be coupled to a first bus 1416 via an interface 1496. In one embodiment, first bus 1416 may be a Peripheral Component Interconnect (PCI) bus, or a bus such as a PCI Express bus or another third generation I/O interconnect bus, although the scope of the present disclosure is not so limited.

As shown in FIG. 14, various I/O devices 1414 are coupled to first bus 1416, along with a bus bridge 1418 which couples first bus 1416 to a second bus 1420. In one embodiment, second bus 1420 includes a low pin count (LPC) bus. Various devices are coupled to second bus 1420 including, for example, a keyboard and/or mouse 1422, communication devices 1427 and a storage unit 1428 such as a disk drive or other mass storage device which often includes instructions/code and data 1430, in one embodiment. Further, an audio I/O 1424 is shown coupled to second bus 1420. Note that other architectures are possible, where the included components and interconnect architectures vary. For example, instead of the point-to-point architecture of FIG. 14, a system may implement a multi-drop bus or other such architecture.

Figure 15:
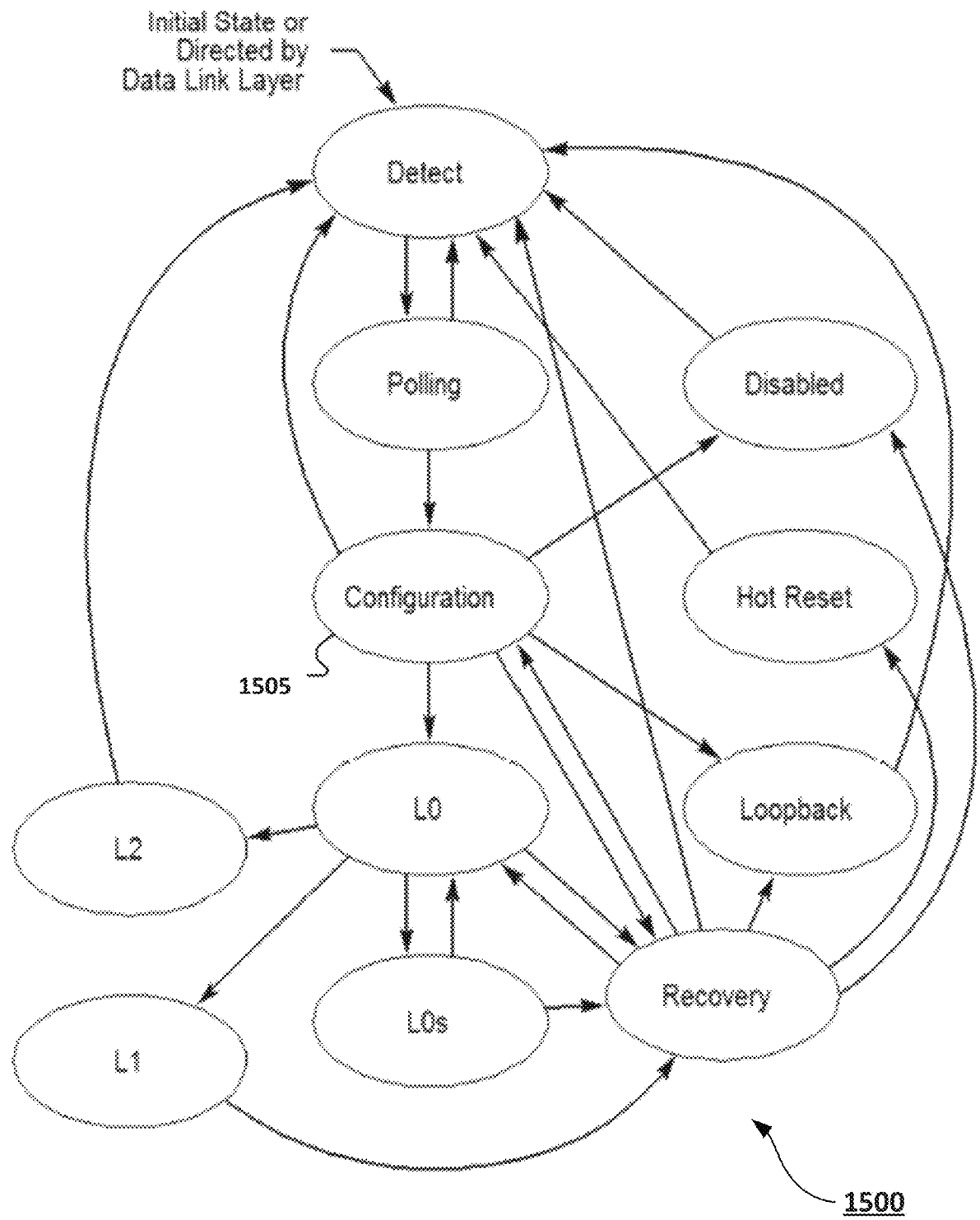
FIG. 15 is a diagram illustrating an example link training state machine.

Turning to the diagram 1500 of FIG. 15, an example link training state machine is shown, such as the PCIe link training and status state machine (LTSSM). For a system utilizing a PHY according to a particular protocol to support multiple alternative protocols (i.e., to run on top of the PHY), ordered sets may be defined that are to be communicated between two or more devices on a link in connection with the training of the link. For instance, training set (TS) ordered sets (OSes) may be sent. In an implementation utilizing PCIe as the PHY protocol, the TS ordered sets may include a TS1 and a TS2 ordered set, among other example ordered sets. The ordered sets and training sequences sent during link training may be based on the particular link training state, with various link training states utilized to accomplish corresponding link training activities and objectives.

In one example, such as illustrated in FIG. 15, a link training state machine 1600 may include such states as a Reset state, a Detect state (e.g., to detect a far end termination (e.g., another device connected to the lanes), a Polling state (e.g., to establish symbol lock and configure lane polarity), a Configuration (or "Config") state (e.g., to configure the physical lanes of a connection into a link with particular lane width, lane numbering, etc., performing lane-to-lane deskew and other link configuration activities), a Loopback state (e.g., to perform testing, fault isolation, equalization, and other tasks), a Recovery state (e.g., for use to change the data rate of operation, re-establish bit lock, Symbol lock or block alignment, perform lane-to-lane deskew, etc.) among other states, which may be utilized to bring the link to an active link state (e.g., L0). In one example, training sequences to be sent in a particular one (or more) of the link training states may be defined to accommodate the negotiation of a particular one of the supported protocols of a particular device. For instance, the particular training state may be a training state preceding entry into an active link state, or a training state in which the data rate may be upscaled (e.g., beyond that supported by at least one of the supported protocols), such as a PCIe state where a data rate transitions from a Gen1 speed to Gen3 and higher speeds, among other examples. For instance, in the example implementation shown in FIG. 15, a configuration state (e.g., 1505) may be utilized and augmented to allow negotiation of a particular one of multiple protocols in parallel with the link training activities defined natively in the training state (e.g., lane width determination, lane numbering, deskew, equalization, etc.). For instance, particular training sequences may be defined for the training state and these training sequences may be augmented to allow information to be communicated (e.g., in one or more fields or symbols of the ordered set) to identify whether each device on the link supports multiple protocols (e.g., at least one protocol stack other than the protocol stack of the physical layer and the corresponding link training state machine), identify the particular protocols each device supports, and agree upon one or more protocols to employ over the particular PHY (e.g., through a handshake accomplished through the transmission of these training sequences across the link (in both the upstream and downstream directions)).

In one example, a PCIe physical layer may be utilized to support multiple different protocols. Accordingly, a particular training state in a PCIe LTSSM may be utilized for the negotiation of protocols between devices on a link. As noted above, the protocol determination may occur even before the link trains to an active state (e.g., L0) in the lowest supported data rate (e.g., the PCIe Gen 1 data rate). In one example, the PCIe Config state may be used. Indeed, the PCIe LTSSM may be used to negotiate the protocol by using modified PCIe Training Sets (e.g., TS1 and TS2) after the link width negotiation and (at least partially) in parallel with lane numbering performed during the Config state.

While this disclosure has been described with respect to a limited number of embodiments, those skilled in the art will appreciate numerous modifications and variations therefrom. It is intended that the appended claims cover all such modifications and variations as fall within the true spirit and scope of this present disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase "to" or "configured to," in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

The systems, methods, and apparatuses can include one or a combination of the following examples:

Example 1 is an apparatus comprising a power management controller to determine a low power mode exit timing from a plurality of low power mode exit timing options, and cause the setting of a low power mode control register based on the determined low power mode exit timing; and a message generator to generate a power mode request message, the power mode request message indicating the determined low power mode exiting timing; the apparatus to transmit the power mode request message to a host across a multilane link.

Example 2 may include the subject matter of example 1, wherein the message generator comprises a Vendor Defined Message (VDM) generator to generate a VDM message that includes the determined low power mode exiting timing.

Example 3 may include the subject matter of example 2, further comprising a VDM receiver to receive a VDM response message from a connected host across the multilane link, and determine that the VDM response message indicates that the host denies the request for the low power mode exiting timing; the power management controller to determine a second low power mode exiting timing; and the VDM generator to generate a second VDM message with the second low power mode exit timing.

Example 4 may include the subject matter of example 1, wherein the message generator comprises a Latency Tolerance Reporting (LTR) message generator to generate an LTR message that includes the determined low power mode exiting timing.

Example 5 may include the subject matter of example 4, wherein the LTR message comprises a latency scale field, wherein the latency scale field comprises encoding representing the determined low power mode exiting timing.

Example 6 may include the subject matter of any of examples 1-5, wherein the low power control register comprises an L1 power mode substates control 2 register, the power management controller to set a T_POWER_ON_SCALE and T_POWER_ON_VALUE bit to indicate the determined low power mode exiting timing.

Example 7 may include the subject matter of any of examples 1-6, further comprising a Tpower_on switch to set the low power mode control register based on the determined low power mode exit timing.

Example 8 may include the subject matter of any of examples 1-7, the power management controller to receive a power mode capability read request from a host; determine power capability information; and transmit the power capability information to the host.

Example 9 may include the subject matter of example 8, further comprising a Vendor-Defined Message (VDM) generator and a VDM receiver. The VDM receiver to receive a VDM message requesting power capability information, and determine power capability information based on a power capability table. The VDM generator to compose a VDM message comprising power mode capability read response indicating the power capabilities of the apparatus. The apparatus to send the VDM message to the host.

Example 10 may include the subject matter of example 8, the power management controller to receive a configuration read message from the host requesting an indication of power capabilities of the apparatus; determine the power capabilities from a vendor-specific extended capability (VSEC) registers; and indicate the power capabilities to the host from the VSEC registers.

Example 11 is a method comprising determining a low power mode exit timing from a plurality of low power mode exit timing options, setting of a low power mode control register based on the determined low power mode exit timing; generating a power mode request message, the power mode request message indicating the determined low power mode exiting timing; and transmitting the power mode request message to a host device across a multilane link.

Example 12 may include the subject matter of example 11, wherein generating a power mode request message comprises generating a VDM message that includes the determined low power mode exiting timing.

Example 13 may include the subject matter of example 12, further comprising receiving a VDM response message from a connected host across the multilane link, and determining that the VDM response message indicates that the host denies the request for the low power mode exiting timing; determining a second low power mode exiting timing; and generating a second VDM message with the second low power mode exit timing.

Example 14 may include the subject matter of example 11, wherein generating a power mode request message comprises generating a Latency Tolerance Reporting (LTR) message that includes the determined low power mode exiting timing.

Example 15 may include the subject matter of example 14, wherein the LTR message comprises a latency scale field, wherein the latency scale field comprises encoding representing the determined low power mode exiting timing.

Example 16 may include the subject matter of any of examples 11-15, wherein the low power control register comprises an L1 power mode substates control 2 register, the method comprising setting a T_POWER_ON_SCALE and T_POWER_ON_VALUE bit to indicate the determined low power mode exiting timing.

Example 17 may include the subject matter of any of examples 11-16, further comprising receiving a power mode capability read request from a host; determining power capability information; and transmitting the power capability information to the host.

Example 18 may include the subject matter of example 17, wherein receiving a power mode capability read request from a host comprises receiving a VDM message requesting power capability information, determining power capability information comprises determining power capability information based on a power capability table. The method further comprising composing a VDM message comprising power mode capability read response indicating the power capabilities of the apparatus; and transmitting the VDM message to the host.

Example 19 may include the subject matter of example 17, further comprising receiving a configuration read message from the host requesting an indication of power capabilities of the apparatus; determining the power capabilities from a vendor-specific extended capability (VSEC) registers; and indicating the power capabilities to the host from the VSEC registers.

Example 20 is a system comprising a host comprising a system power management unit implemented at least partially in hardware and a device connected to the host across a multilane link. The device comprising a power management controller to determine a low power mode exit timing from a plurality of low power mode exit timing options, cause the setting of a low power mode control register based on the determined low power mode exit timing; and a message generator to generate a power mode request message, the power mode request message indicating the determined low power mode exiting timing; the device to transmit the power mode request message to the system power management unit across the multilane link.

Example 21 may include the subject matter of example 20, wherein the message generator comprises a Vendor Defined Message (VDM) generator to generate a VDM message that includes the determined low power mode exiting timing.

Example 22 may include the subject matter of example 21, the system power management unit to determine that the low power mode exiting timing determined by the device should not be used, and composing a VDM message indicating that the host has denied the determined low power mode exiting timing; the device further comprising a VDM receiver to receive a VDM response message from a connected host across the multilane link, and determine that the VDM response message indicates that the host denies the request for the low power mode exiting timing; the power management controller to determine a second low power mode exiting timing; and the device comprising a VDM generator to generate a second VDM message with the second low power mode exit timing.

Example 23 may include the subject matter of example 20, wherein the message generator comprises a Latency Tolerance Reporting (LTR) message generator to generate an LTR message that includes the determined low power mode exiting timing.

Example 24 may include the subject matter of example 23, wherein the LTR message comprises a latency scale field, wherein the latency scale field comprises encoding representing the determined low power mode exiting timing.

Example 25 may include the subject matter of any of examples 20-24, wherein the low power control register comprises an L1 power mode substates control 2 register, the power management controller to set a T_POWER_ON_SCALE and T_POWER_ON_VALUE bit to indicate the determined low power mode exiting timing.

Example 26 may include the subject matter of any of examples 20-25, further comprising a Tpower_on switch to set the low power mode control register based on the determined low power mode exit timing.

Example 27 may include the subject matter of any of examples 20-26, the system power management unit to cause the host to transmit to the device a power mode capability request message. The power management controller to receive the power mode capability read request from the host; determine power capability information; and transmit the power capability information to the host.

Example 28 may include the subject matter of example 27, the host further comprising a Vendor-Defined Message (VDM) generator and a VDM receiver, the VDM generator to compose a VMD message comprising the power mode capability read request; the device comprising a VDM receiver, the VDM receiver to receive a VDM message requesting power capability information, and determine power capability information based on a power capability table. The VDM generator to compose a VDM message comprising power mode capability read response indicating the power capabilities of the device. The device to send the VDM message to the host.

Example 29 may include the subject matter of example 28, the power management controller to receive a configuration read message from the host requesting an indication of power capabilities of the apparatus; determine the power capabilities from a vendor-specific extended capability (VSEC) registers; and indicate the power capabilities to the host from the VSEC registers.

Example 30 is a machine readable medium including code, when executed, to cause a machine to perform the method of any one of examples 11-19.

Example 31 is at least one non-transitory machine readable media including code, when executed to cause a machine to determine a low power mode exit timing from a plurality of low power mode exit timing options, set of a low power mode control register based on the determined low power mode exit timing; generate a power mode request message, the power mode request message indicating the determined low power mode exiting timing; and transmit the power mode request message to a host device across a multilane link.

Example 32 may include the subject matter of example 31, wherein generating a power mode request message comprises generating a VDM message that includes the determined low power mode exiting timing.

Example 33 may include the subject matter of example 32, the code, when executed, to cause a machine to receive a VDM response message from a connected host across the multilane link, determine that the VDM response message indicates that the host denies the request for the low power mode exiting timing; determine a second low power mode exiting timing; and generate a second VDM message with the second low power mode exit timing.

Example 34 may include the subject matter of example 31, wherein generating a power mode request message comprises generating a Latency Tolerance Reporting (LTR) message that includes the determined low power mode exiting timing.

Example 35 may include the subject matter of example 34, wherein the LTR message comprises a latency scale field, wherein the latency scale field comprises encoding representing the determined low power mode exiting timing.

Example 36 may include the subject matter of any of examples 31-35, wherein the low power control register comprises an L1 power mode substates control 2 register, the method comprising setting a T_POWER_ON_SCALE and T_POWER_ON_VALUE bit to indicate the determined low power mode exiting timing.

Example 37 may include the subject matter of any of examples 31-36, the code, when executed, causes a machine to receive a power mode capability read request from a host; determine power capability information; and transmit the power capability information to the host.

Example 38 may include the subject matter of example 37, wherein receiving a power mode capability read request from a host comprises receiving a VDM message requesting power capability information, determining power capability information comprises determining power capability information based on a power capability table. The code when executed causes a machine to compose a VDM message comprising power mode capability read response indicating the power capabilities of the apparatus; and transmit the VDM message to the host.

Example 39 may include the subject matter of example 37, the code when executed causes a machine to receive a configuration read message from the host requesting an indication of power capabilities of the apparatus; determine the power capabilities from a vendor-specific extended capability (VSEC) registers; and indicate the power capabilities to the host from the VSEC registers.

Example 40 is an apparatus that includes means for determining a low power mode exit timing from a plurality of low power mode exit timing options; means for setting of a low power mode control register based on the determined low power mode exit timing; means for generating a power mode request message, the power mode request message indicating the determined low power mode exiting timing; and means for transmitting the power mode request message to a host across a multilane link.

What is claimed is:

1. An apparatus comprising:
a power management controller to:
   determine a low power mode exit timing from a plurality of low power mode exit timing options, and
   cause the setting of a low power mode control register based on the determined low power mode exit timing; and
a message generator to generate a power mode request message, the power mode request message indicating the determined low power mode exiting timing;
the apparatus to transmit the power mode request message to a host across a multilane link;
the power management controller to:
receive a power mode capability read request from a host;
determine power capability information; and
transmit the power capability information to the host;
the apparatus further comprising a Vendor-Defined Message (VDM) generator and a VDM receiver;
the VDM receiver to:
   receive a VDM message requesting power capability information, and
   determine power capability information based on a power capability table;
the VDM generator to compose a VDM message comprising power mode capability read response indicating the power capabilities of the apparatus;
the apparatus to send the VDM message to the host.

2. The apparatus of claim 1, wherein the message generator comprises a Vendor Defined Message (VDM) generator to generate a VDM message that includes the determined low power mode exiting timing.

3. The apparatus of claim 2, further comprising a VDM receiver to:
   receive a VDM response message from a connected host across the multilane link, and
   determine that the VDM response message indicates that the host denies the request for the low power mode exiting timing;
the power management controller to determine a second low power mode exiting timing; and
the VDM generator to generate a second VDM message with the second low power mode exit timing.

4. The apparatus of claim 1, wherein the message generator comprises a Latency Tolerance Reporting (LTR) message generator to generate an LTR message that includes the determined low power mode exiting timing.

5. The apparatus of claim 4, wherein the LTR message comprises a latency scale field, wherein the latency scale field comprises encoding representing the determined low power mode exiting timing.

6. The apparatus of claim 1, wherein the low power control register comprises an L1 power mode substates control 2 register, the power management controller to set a T_POWER_ON_SCALE and T_POWER_ON_VALUE bit to indicate the determined low power mode exiting timing.

7. The apparatus of claim 1, further comprising a Tpower_on switch to set the low power mode control register based on the determined low power mode exit timing.

8. The apparatus of claim 1, the power management controller to:
   receive a configuration read message from the host requesting an indication of power capabilities of the apparatus;
   determine the power capabilities from a vendor-specific extended capability (VSEC) registers; and
   indicate the power capabilities to the host from the VSEC registers.

9. A method comprising:
determining a low power mode exit timing from a plurality of low power mode exit timing options,
setting of a low power mode control register based on the determined low power mode exit timing;
generating a power mode request message, the power mode request message indicating the determined low power mode exiting timing; and
transmitting the power mode request message to a host device across a multilane link;
the method further comprising:
receiving a power mode capability read request from a host;
determining power capability information; and
transmitting the power capability information to the host;
wherein:
receiving a power mode capability read request from a host comprises receiving a VDM message requesting power capability information,
determining power capability information comprises determining power capability information based on a power capability table;
the method further comprising:
   composing a VDM message comprising power mode capability read response indicating the power capabilities of the apparatus; and
   transmitting the VDM message to the host.

10. The method of claim 9, wherein generating a power mode request message comprises generating a VDM message that includes the determined low power mode exiting timing.

11. The method of claim 10, further comprising:
receiving a VDM response message from a connected host across the multilane link, and
determining that the VDM response message indicates that the host denies the request for the low power mode exiting timing;
determining a second low power mode exiting timing; and
generating a second VDM message with the second low power mode exit timing.

12. The method of claim 9, wherein generating a power mode request message comprises generating a Latency Tolerance Reporting (LTR) message that includes the determined low power mode exiting timing.

13. The method of claim 12, wherein the LTR message comprises a latency scale field, wherein the latency scale field comprises encoding representing the determined low power mode exiting timing.

14. The method of claim 9, wherein the low power control register comprises an L1 power mode substates control 2 register, the method comprising setting a T_POWER_ON_SCALE and T_POWER_ON_VALUE bit to indicate the determined low power mode exiting timing.

15. The method of claim 9, further comprising:
receiving a configuration read message from the host requesting an indication of power capabilities of the apparatus;
determining the power capabilities from a vendor-specific extended capability (VSEC) registers; and
indicating the power capabilities to the host from the VSEC registers.

16. A system comprising:
a host comprising a system power management unit implemented at least partially in hardware;
a device connected to the host across a multilane link, the device comprising:
a power management controller to:
determine a low power mode exit timing from a plurality of low power mode exit timing options,
cause the setting of a low power control register based on the determined low power mode exit timing; and
a message generator to generate a power mode request message, the power mode request message indicating the determined low power mode exiting timing;
the device to transmit the power mode request message to the system power management unit across the multilane link;
the device comprising a Vendor-Defined Message (VDM) generator and a VDM receiver;
the VDM receiver to:
receive a VDM message requesting power capability information, and
determine power capability information based on a power capability table;
the VDM generator to compose a VDM message comprising power mode capability read response indicating the power capabilities of the device;
the device to send the VDM message to the host.

17. The system of claim 16, wherein the message generator comprises a Vendor Defined Message (VDM) generator to generate a VDM message that includes the determined low power mode exiting timing.

18. The system of claim 17, the system power management unit to:
determine that the low power mode exiting timing determined by the device should not be used, and
composing a VDM message indicating that the host has denied the determined low power mode exiting timing;
the device further comprising a VDM receiver to:
receive a VDM response message from a connected host across the multilane link, and
determine that the VDM response message indicates that the host denies the request for the low power mode exiting timing;
the power management controller to determine a second low power mode exiting timing; and
the device comprising a VDM generator to generate a second VDM message with the second low power mode exit timing.

19. The system of claim 16, wherein the message generator comprises a Latency Tolerance Reporting (LTR) message generator to generate an LTR message that includes the determined low power mode exiting timing.

20. The system of claim 19, wherein the LTR message comprises a latency scale field, wherein the latency scale field comprises encoding representing the determined low power mode exiting timing.

21. The system of claim 16, wherein the low power control register comprises an L1 power mode substates control 2 register, the power management controller to set a T_POWER_ON_SCALE and T_POWER_ON_VALUE bit to indicate the determined low power mode exiting timing.

* * * * *